United States Patent
Simpson et al.

(12) 
(10) Patent No.: US 6,453,129 B1
(45) Date of Patent: Sep. 17, 2002

(54) SYSTEM AND METHOD FOR PROVIDING JOB ASSURANCE

(75) Inventors: Shell S. Simpson, Boise, ID (US); Ward S. Foster, Boise, ID (US); Kris R. Livingston, Boise, ID (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/816,811

(22) Filed: Mar. 23, 2001

(51) Int. Cl.[7] .......................... G06F 15/00; G03G 15/00
(52) U.S. Cl. ........................ 399/23; 358/1.15; 399/8; 399/24; 399/27
(58) Field of Search .................... 358/1.14, 1.15; 399/8, 23, 24, 27

(56) References Cited

U.S. PATENT DOCUMENTS

| | | | |
|---|---|---|---|
| 5,230,573 A | 7/1993 | Yasuoka et al. | 400/54 |
| 5,697,014 A | 12/1997 | Makino | 399/65 |
| 5,794,094 A | 8/1998 | Boockholdt et al. | 399/27 |
| 6,052,545 A | 4/2000 | Komiya et al. | 399/61 |
| 6,078,761 A | 6/2000 | de Waal | 399/61 |
| 6,327,045 B1 * | 12/2001 | Teng et al. | 358/1.15 |

* cited by examiner

*Primary Examiner*—Hoang Ngo
(74) *Attorney, Agent, or Firm*—James R. McDaniel

(57) ABSTRACT

This invention relates to a web-based imaging system that provides print job assurance. Such system of this type, generally, warn the user, prior to printing, whether or not the print job will be able to be printed, as expected.

19 Claims, 25 Drawing Sheets

SYSTEM AND METHOD FOR PROVIDING JOB ASSURANCE

FIELD OF THE INVENTION

This invention relates to a Web-based imaging system that provides print job assurance. Such systems of this type, generally, warn the user, prior to printing, whether or not the print job will be able to be printed, as expected.

DESCRIPTION OF THE RELATED ART

It is known, in the printing arts, to employ consumable level detection technologies. Exemplary of such prior is U.S. Pat. No. 5,230,573 ('573) to T. Yasuoka et al., entitled "Printer with Upstream Sensor Used to Determine Paper Empty Condition," U.S. Pat. No. 5,697,014 ('014) to K. Makino, entitled "Toner Level Detecting Device Having a Substantially Non-Uniform Width and Toner Storage Box Having Same," commonly assigned U.S. Pat. No. 5,794,094 ('094) to D. Boockholdt et al., entitled "Accurate Toner Level Feedback Via Active Artificial Intelligence," U.S. Pat. No. 6,052,545 ('545) to Y. Komiya et al., entitled "Image Forming Apparatus," and U.S. Pat. No. 6,078,761 ('761) to C. A. de Waal, entitled "Development Unit for a Reproduction Apparatus." While these references employ consumable level detection technologies, they are not utilized in Web-based Imaging and they do not provide information regarding print job assurance.

It is apparent from the above that there exists a need in the art for a Web-based Imaging system that provides feedback to the user regarding print job assurance so that the user can determine whether or not to use that particular printer or printing device can complete the print job. It is a purpose of this invention to fulfill this and other needs in the art in a manner more apparent to the skilled artisan once given the following disclosure.

SUMMARY OF THE INVENTION

Generally speaking, this invention fulfills these needs by providing a method for print job assurance, comprising the steps of: selecting a document to be printed; selecting a target printer; viewing a characteristic of the document on target printer home page; determining if the target printer can print the document; and printing the document.

In certain preferred embodiments, the document or portions of the document can be prepared by the user just prior to printing or the user can download the document or portions of the document from the Internet. Also, the determination step includes the steps of having the target printer send information to the target printer home page regarding the amount of consumables that are readily available to be used by the printer. Consumables being, but not limited to, paper, toner, ink or the like.

In another further preferred embodiment, the print job assurance system allows the user to see if the print job will be completed given the amount of consumables available to the printer.

The preferred print job assurance system, according to the present invention, offers the following advantages: ease of use; excellent print job assurance characteristics; and excellent economy. In fact, in many of the preferred embodiments, these factors of print job assurance characteristics and economy are optimized to an extent that is considerably higher than heretofore achieved in prior, known print job assurance systems.

The above and other features of the present invention, which will become more apparent as the description proceeds, are best understood by considering the following detailed description in conjunction with the accompanying drawings, wherein like characters represent like parts throughout the several views and in which:

DETAILED DESCRIPTION OF THE INVENTION

Figure 1:
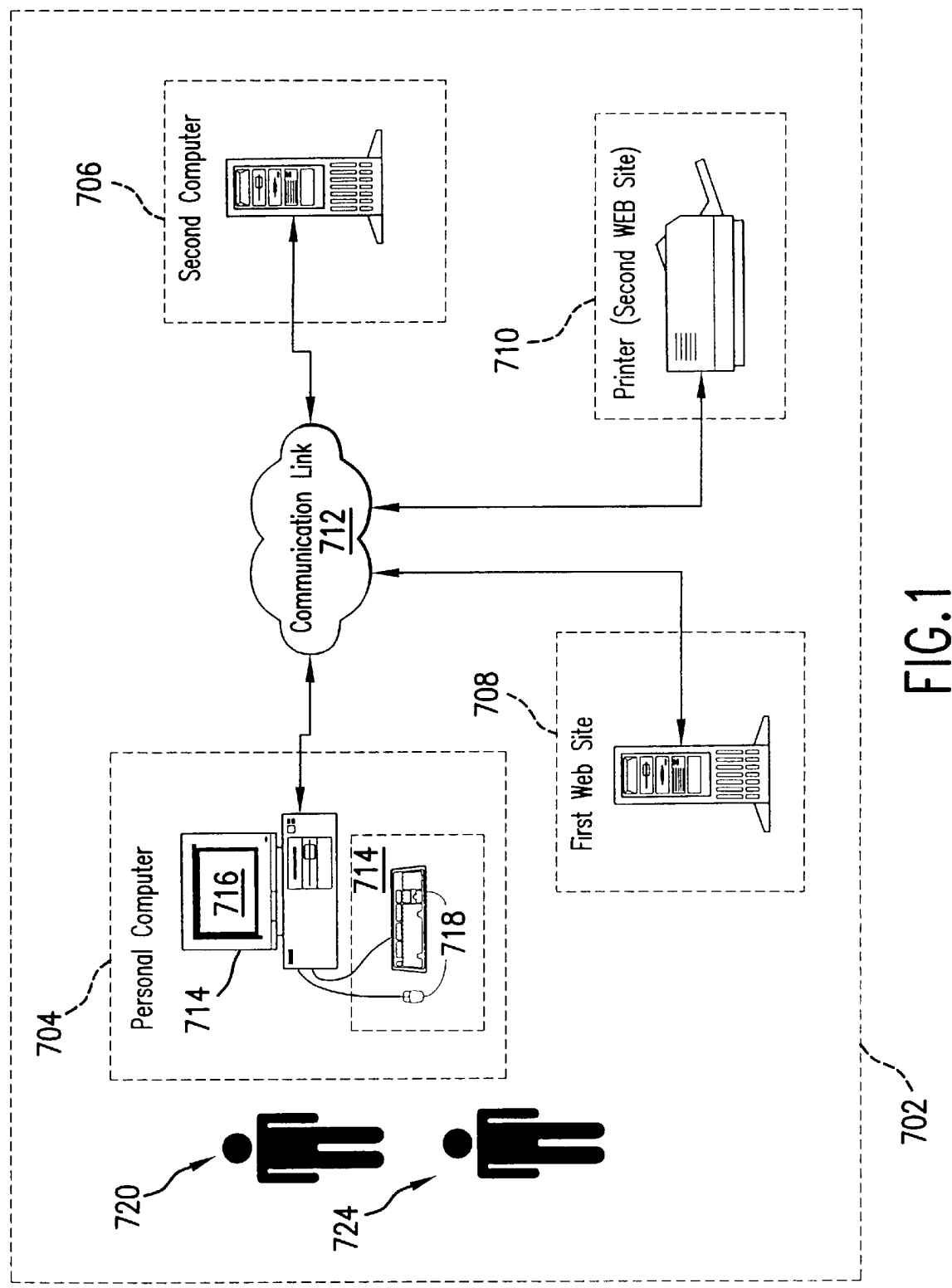
FIG. 1 illustrates an architectural diagram of a client-server system that operates in accordance with one embodiment of the present invention.

As set forth in commonly assigned U.S. patent application Ser. No. 09/712,336 to S. Simpson et al., entitled "System and Method for Processing Data in a Distributed Environment", which was filed on Nov. 13, 2000 and is incorporated entirely by reference, to facilitate a complete understanding of the invention the following terms and acronyms are used throughout the detailed description:

Client-Server. A model of interaction in a distributed system in which a program at one site sends a request to a program at another site and waits for a response. The requesting program is called the "client," and the program that responds to the request is called the "server." In the context of the World Wide Web (discussed below), the client is a "Web browser" (or simply "browser") which runs on a computer of a user; the program which responds to browser requests by serving Web pages, or other types of Web content, is commonly referred to as a "Web server."

Content. A set of executable instructions that is served by a server to a client and which is intended to be executed by the client so as to provide the client with certain functionality. Web content refers to content that is meant to be executed by operation of a Web browser. Web content, therefore, may include (the following is a non-exhaustive list) one or more of the following: HTML code, Java script™ Java Program(s) and C-"Sharp" code Hyperlink. A navigational link is from one document to another, from one portion (or component) of a document to another, or to a Web resource, such as a Java applet. Typically, a hyperlink is displayed as a highlighted word or phrase that can be selected by clicking on it using a mouse to jump to the associated document or document portion or to retrieve a particular resource.

Hypertext System. A computer-based informational system in which documents (and possibly other types of data entities) are linked together via hyperlinks to form a user-navigable "web."

Internet. A collection of interconnected (public and/or private) networks that are linked together by a set of standard protocols (such as TCP/IP and HTTP) to form a global, distributed network. (While this term is intended to refer to what is now commonly known as the Internet, it is also intended to encompass variations that may be made in the future, including changes and additions to existing standard protocols).

World Wide Web ("Web"). Used herein to refer generally to both (i) a distributed collection of interlinked, user-viewable Hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols that may be used in place of (or in addition to) HTML and HTTP.

Web Site. A computer system that serves informational content over a network using the standard protocols of the World Wide Web. Typically, a Web site corresponds to a particular Internet domain name, such as "HP.com," and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for Web site users. Importantly, a Web Site can have additional functionality, For example, a Web site may have the ability to print documents, scan documents, etc.

HTML (HyperText Markup Language ). A standard coding convention and set of codes for attaching presentation and linking attributes to informational content within documents. (HTML 2.0 is currently the primary standard used for generating Web documents.) During a document authoring stage, the HTML codes (referred to as "tags") are embedded within the informational content of the document. When the Web document (or HTML document) is subsequently transferred from a Web server to a browser, the codes are interpreted by the browser and used to display the document. Additionally in specifying how the Web browser is to display the document, HTML tags can be used to create links to other Web documents (commonly referred to as "hyperlinks"). For more information on HTML, see Ian S. Graham, The HTML Source Book, John Wiley and Sons, Inc., 1995 (ISBN 0471-11894-4).

HTTP (HyperText Transport Protocol). The standard World Wide Web client-server protocol used for the exchange of information (such as HTML documents, and client requests for such documents) between a browser and a Web server. HTTP includes a number of different types of messages that can be sent from the client to the server to request different types of server actions. For example, a "GET" message, which has the format GET <URL>, causes the server to return the document or file located at the specified URL.

URL (Uniform Resource Locator. A unique address which fully specifies the location of a file or other resource on the Internet or a network. The general format of a URL is protocol:

machine address:port/path/filename.

FIG. 1 illustrates the general architecture of a computing system 702 that is in accordance with the invention. The computing system 702 includes a personal computer 704, a second computer 706, a first Web site 708 and a printer 710. The printer 710 also functions as a Web site.

All the devices depicted in FIG. 1 are able to communicate over a communication link 712. Furthermore, the communication link 712 may represent a network, a series of networks, a wireless network(s), the Internet, or any combination thereof.

The personal computer 704 may be any type of computing device that allows a user to interactively browse Web Sites and to perform the functions that are described below. For example, the personal computer 704 may be a personal computer that runs a local operating system, such as a version of MICROSOFT WINDOWS, NT, UNIX or Linux, etc. As shown, the personal computer 704 includes a user interface 714. The user interface 714 includes a display monitor 716 and a user input device(s) 718 for allowing the user to provide input to the computer 704. In this example, the input devices 718 include a keyboard and a mouse. For purposes of the later discussion, it is noted that personal computer 704 is used by multiple users, each having their own user profile. Two of these users, a first user 720, and a second user 724 are depicted. It is assumed that each one of these users has his/her own user profile information and identifier (i.e., user name) stored in the personal computer 704.

For purposes of the later discussion, a user presently logged in to the personal computer 704 at any point in time is referred to herein as the "active user". Thus, if the first user 720 is presently logged into the personal computer 704, that user is presently the "active user".

It is important to note that the devices depicted in FIG. 1 are all in accordance with a system wide standard. Accordingly, this standard specifies a set of generic access requests that are intended to cause an executing computer to access a set of target data describing a target image. In this case, however, each user can have his/her own target image. The target data accessed in response to these requests at any point in time is the target data that is associated with the active user. FIGS. 2–5 are used to illustrate this concept further.

Figure 2:
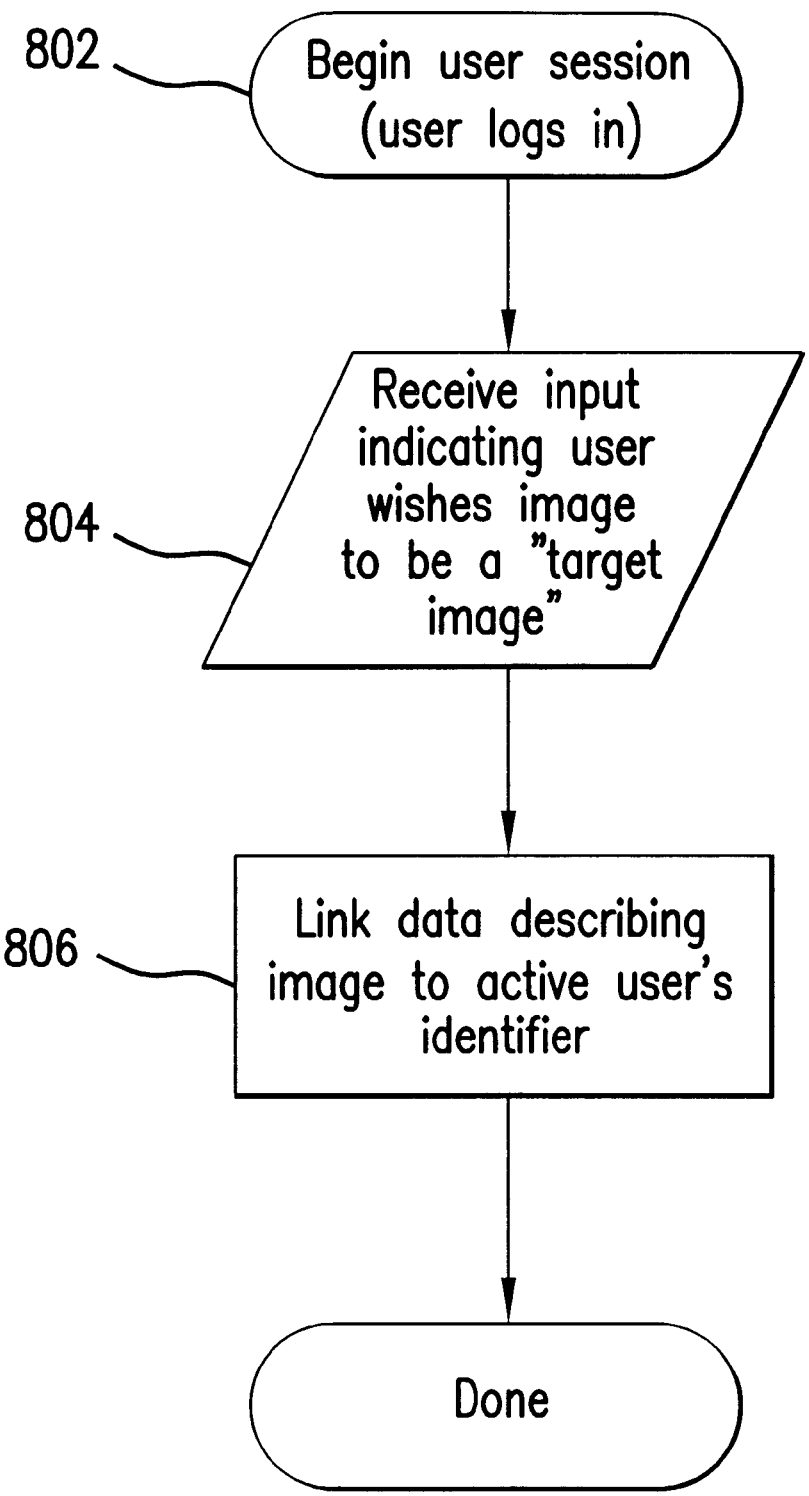
FIG. 2 is a flow diagram illustrating how a personal computer can be operated to identify and store a set of target data.

FIG. 2 is a flow diagram for showing, very generally, how the personal computer 704 can be operated to identify and store a set of target data. As indicated in FIG. 2, a user (e.g., the first user 720 or the second user 724) is assumed to log into to the personal computer 704 (step 802). The personal computer 704 responds in a conventional manner by retrieving the user's preferences and desktop configuration. In this manner, the user becomes the "active user".

Next, it is assumed that the active user provides input that he/she wishes a particular image to be a "target image". The computer 704 receives this input at step 804. In response, the computer 704 responds by identifying the data describing the image as "target data" (step 806). In addition, the computer 704 operates to link the target data to the identifier assigned to the active user 720 (step 806). In this manner, the target data becomes associated with the active user.

Figure 3:
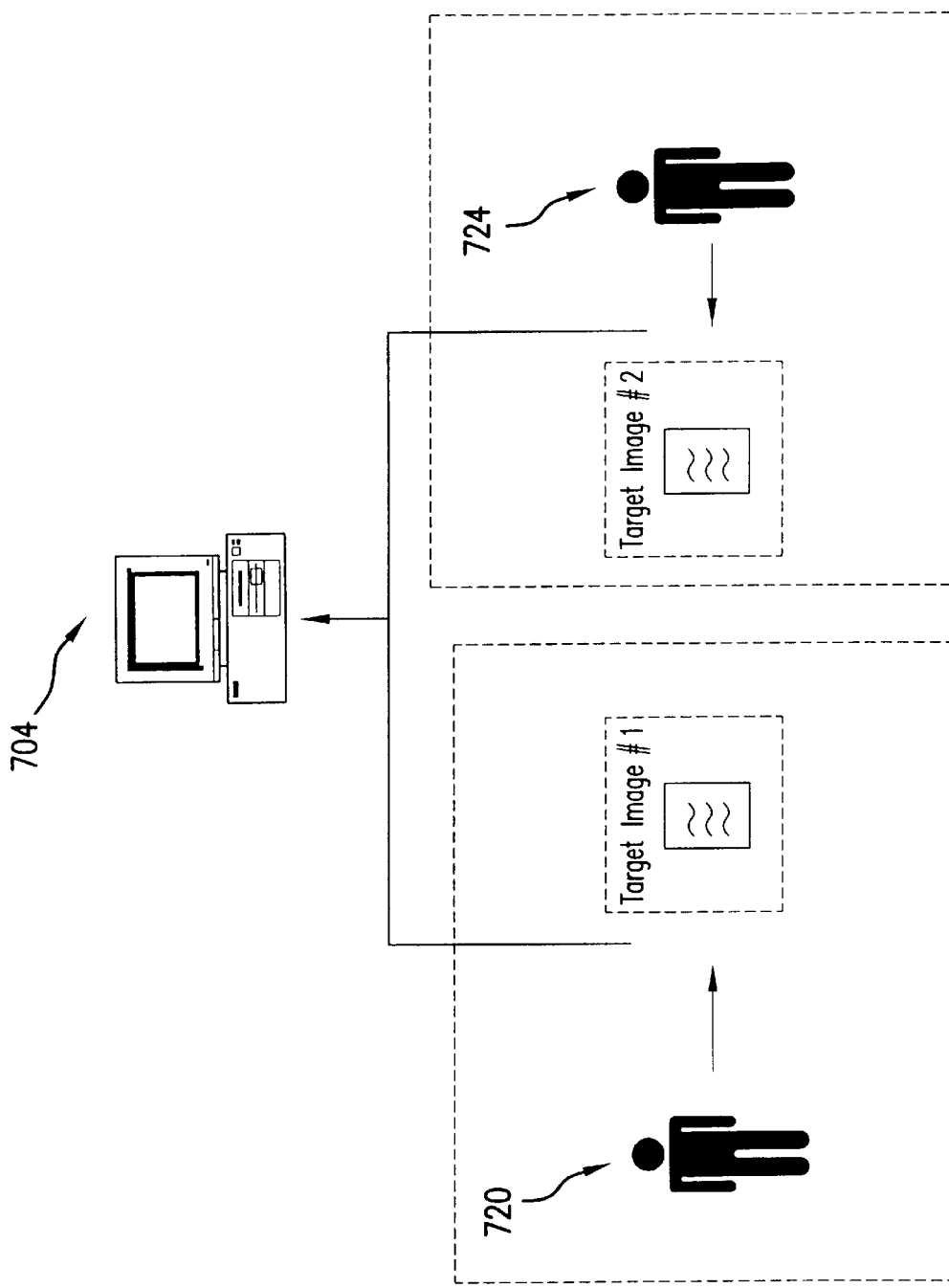
FIG. 3 is an abstract drawing of the personal computer under certain conditions.
Figure 4:
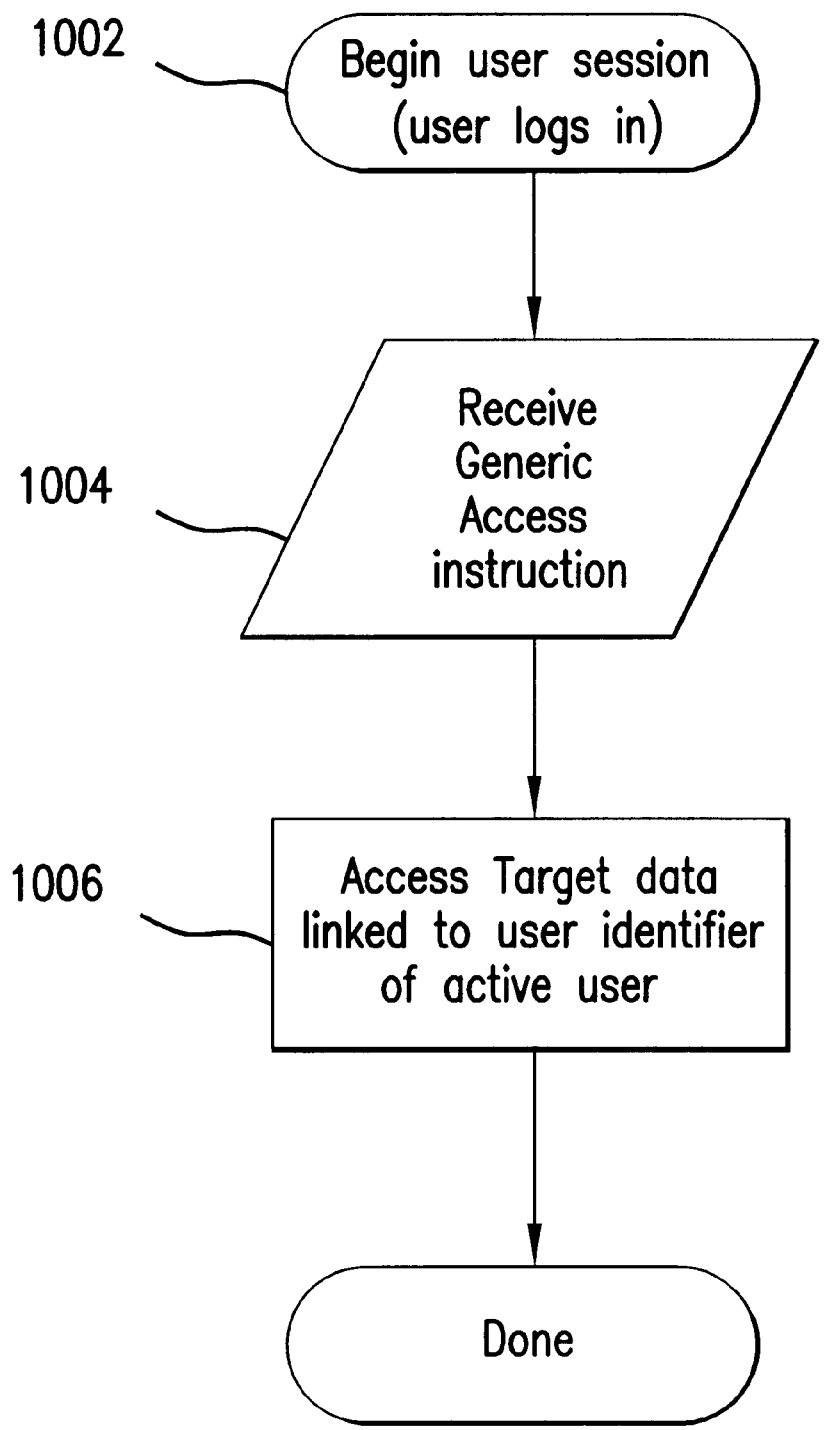
FIG. 4 illustrates very generally the operation of the personal computer in response to a generic access instruction, assuming the conditions depicted in FIG. 3.

Now consider FIGS. 3 and 4. FIG. 3 is an abstract drawing of the personal computer 704 under the following scenario. First, it is assumed that the first user 720 has previously interacted with the personal computer to identify a first target image (target image #1). As a result, the data representing this image has been identified, by the personal computer 704, as target data (target data #1). Additionally, the target data #1 is linked to the identifier assigned to the first user 720.

It is further assumed that the second user 724 has also previously interacted with the personal computer 704 and has identified a second target image (target image #2). As a result, the data describing this image is also identified as target data (target data #2). This second set of data, however, is linked to the identifier assigned to the second user 724.

FIG. 4 illustrates very generally the operation of the personal computer 704 in response to a generic access instruction, assuming the scenario depicted in FIG. 3. As illustrated in FIG. 3, a user is assumed to log in to the personal computer 704 (step 1002). As a result, that user becomes the "active user". Next, the computer 704 is assumed to execute a generic access instruction (step 1004). In response, the personal computer 704 accesses the target data that is linked to the active user's identifier (step 1006).

Thus, if the first user 720 had logged into the personal computer 704 at step 1002, the personal computer 704 would respond to the generic access instruction by accessing the target data #1. Conversely, if the second user 724 had logged into the personal computer 704 at step 1002, the personal computer 704 would respond to the same generic access instruction in a different manner. That is, the personal computer 704 would access the target data #2.

Lets now consider some of the hardware and software components in each one of the devices depicted in FIG. 1.

Figure 5:
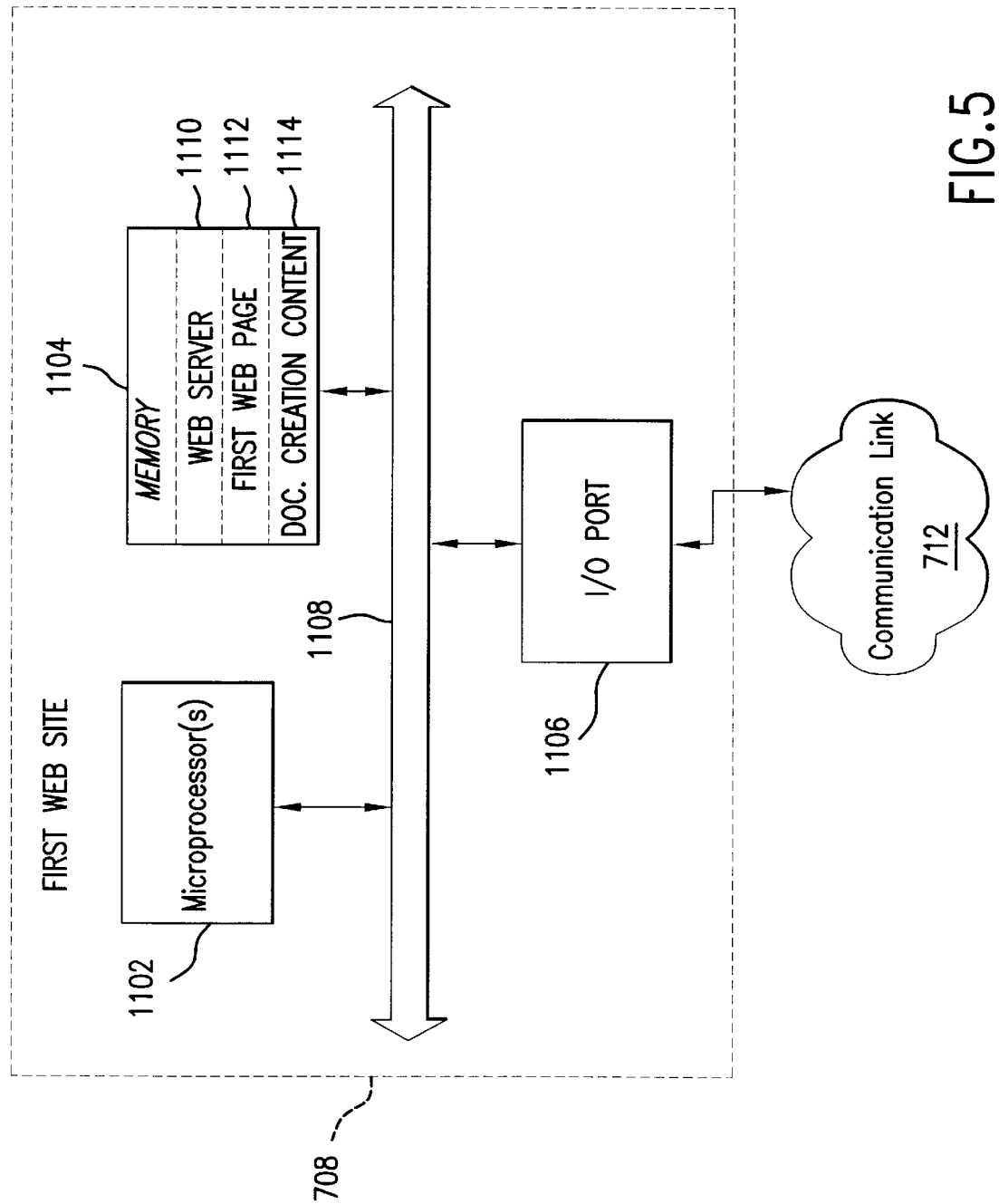
FIG. 5 is a high level block diagram of a first Web site in the client-server system.

FIG. 5 is a high level block diagram of the first Web site 708. As shown, the first Web Site 708 includes a processor 1102, a memory 1104, and an input/output (I/O) port 1106. All these components are connected by one or more local interfaces 1108. The I/O port 1106 links the Web site 708 to the communication link 712. The processor 1102 is used to execute the first Web Server 1110 that is shown stored in the memory 1104.

Also stored in the memory 1104 is a first Web page 1112 and "document creation Web content" 1114. Both the first Web page 1112 and the document creation Web content 1114 are assigned a URL.

As will be described in greater detail below, the document creation Web content 1114 is used to provide a "document creation service" to external devices. Importantly for this discussion, this content includes generic access instructions that are in accordance with the system wide standard. When executed, these instructions result in generic access requests being generated in order to access a set of target data. As mentioned above, generic access instructions are instructions that do not include the location of the target data itself. The "generic access requests" generated from these instructions also do not include the location of the target data.

Figure 6:
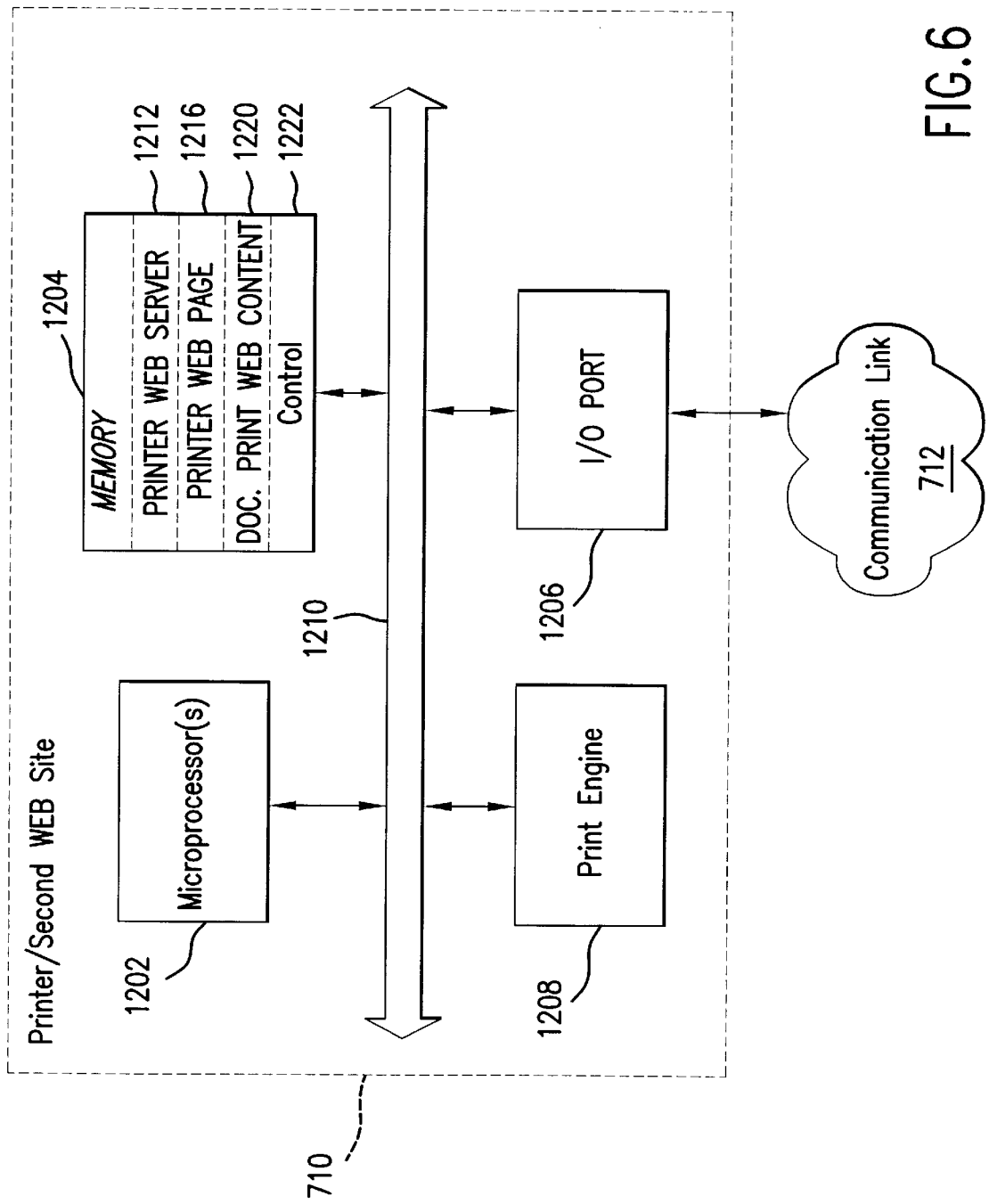
FIG. 6 is a high level block diagram of a printer in the client-server system.

FIG. 6 is a high level block diagram of the printer 710. As shown, the printer 710 includes a processor 1202, a memory 1204, an I/O port 1206, and a print engine 1208. All these components are connected by one or more local interfaces 1210. The I/O port 1206 links the printer 710 to the communication link 712. The print engine 1208 includes the necessary hardware and firmware to print a document.

The processor 1202 is used to execute the print Web Server 1212 and the printer control program 1222 that is shown stored in the memory 1204. Also stored in the memory 1204 is a Web page 1216 and "Document Print Web content" 1220. Both the Web page 1216 and the Document print Web content 1220 are assigned a URL.

As will be described in detail below, the document print content is used to provide a document printing service to external devices. Importantly for this discussion, this content includes generic access instructions that are also in accordance with the system wide standard. When executed, these instructions results in generic access requests being generated.

Figure 7:
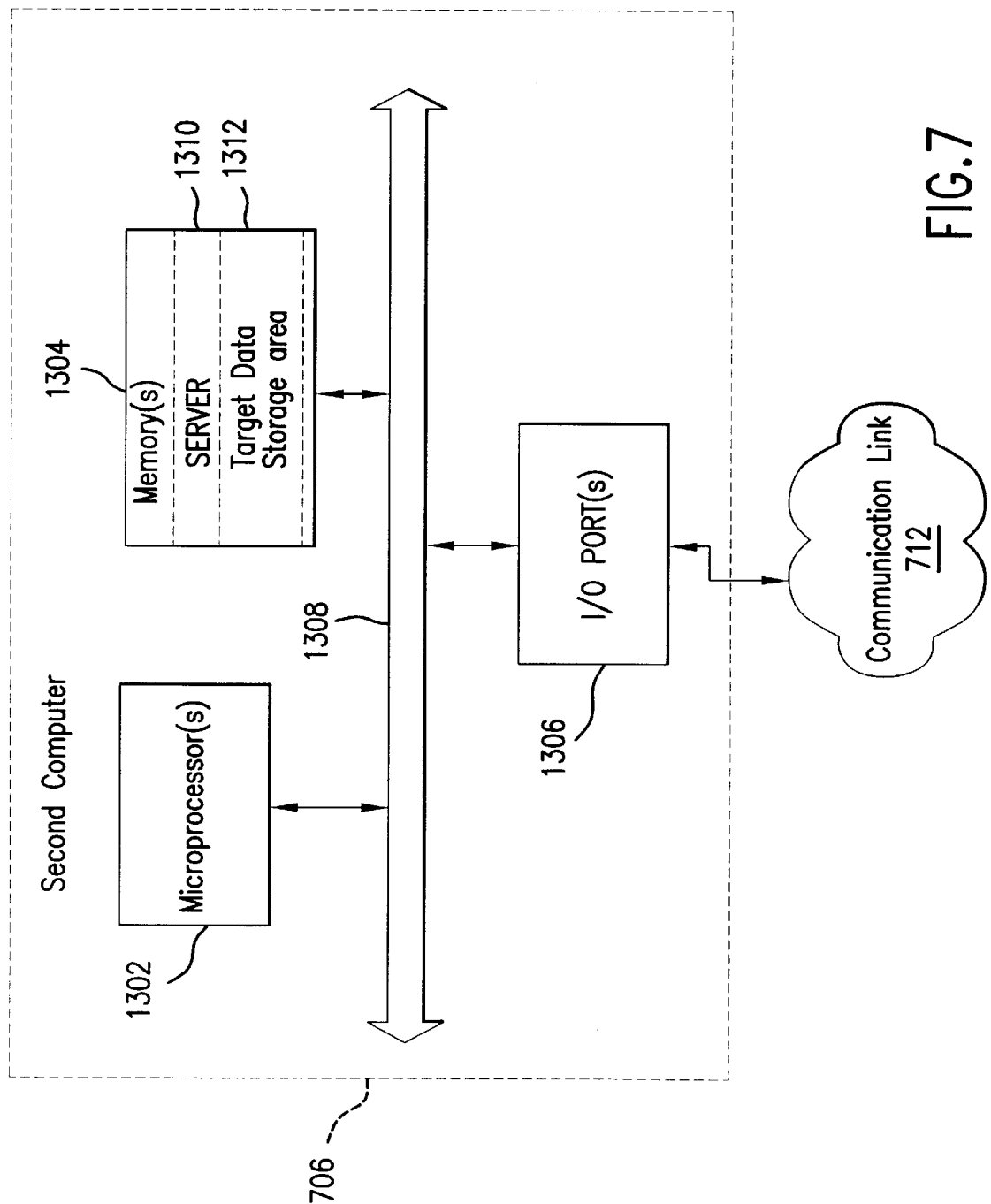
FIG. 7 is a high level block diagram of a second computer in the client-server system.

FIG. 7 is a high level block diagram of the second Computer 706. As shown, the second computer 706 includes a processor 1302, a memory 1304, and an input/output (I/O) port 1306. All these components are connected by one or more local interfaces 1308. The I/O port 1306 links the second computer 1306 to the communication link 712.

The processor 1302 is used to execute the Server 1310 shown stored in the memory 1304. As will be discussed in greater detail below, the memory 1304 includes a reserved storage area 1312 for storing target data that is associated with users of the personal computer 704.

Figure 8:
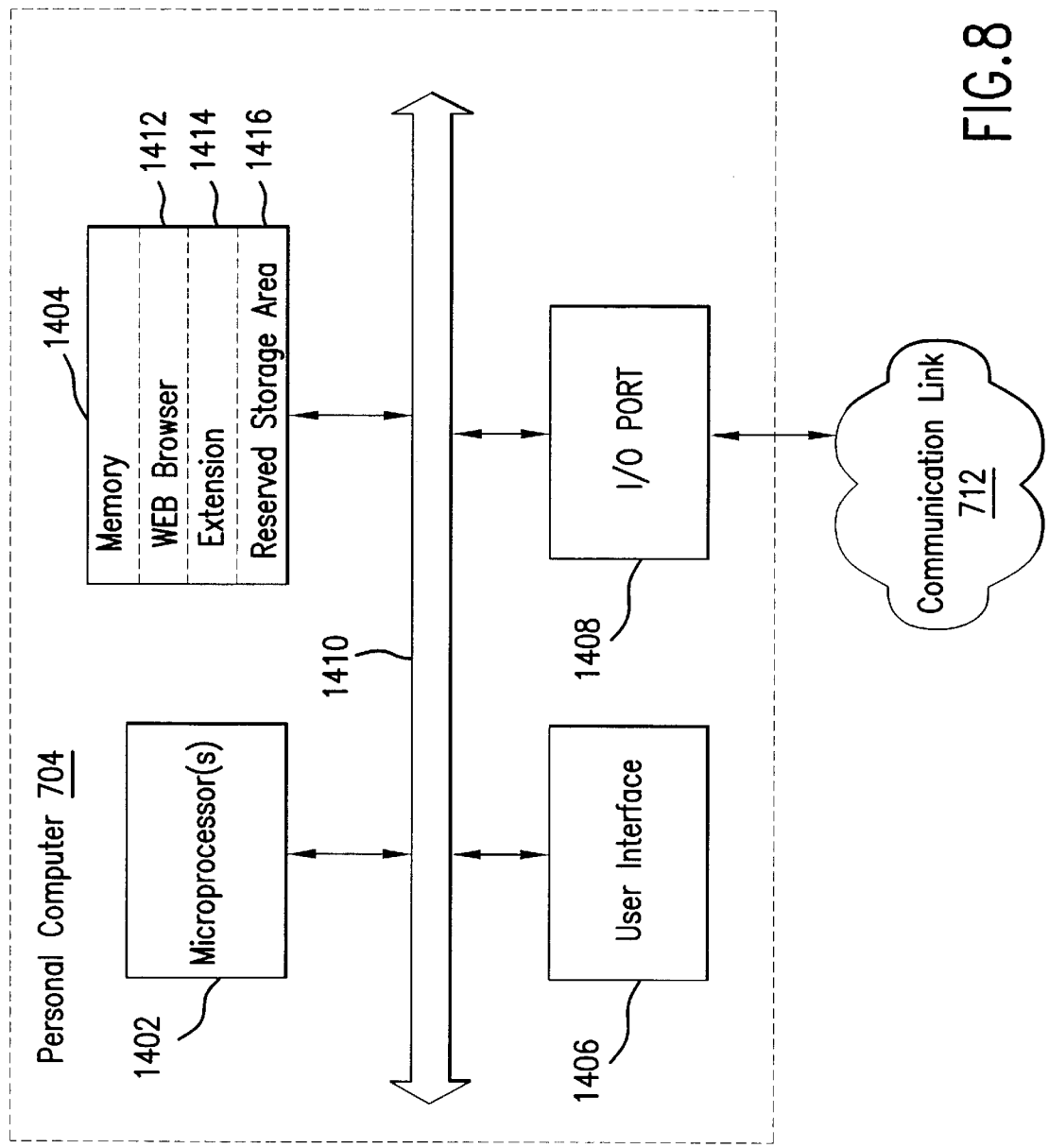
FIG. 8 is a high level diagram of a personal computer in the client-server system.

FIG. 8 is a high level diagram of personal computer 704. As shown, the personal computer 704 includes a processor 1402, a memory 1404 and an input/output (I/O) port 1408. All these components are connected by one or more local interfaces 1410. The I/O port 1408 links the second computer 706 to the communication link 712.

As shown, the memory 1404 includes a reserved storage area 1416 and a Web Browser 1412. The Web Browser 1412 includes an extension component (extension) 1414. The processor 1402 is used to execute the Web Browser 1412.

Importantly, the extension 1414 is configured to respond to generic access requests (generated by downloaded Web Content) by accessing the set of target data that is linked to the current active user. It will be clear to a person skilled in the art that the extension 1414 may be an application programming interface (API) and the generic access requests can be API function calls. It is important to note, however, that the there are other ways to implement the functionality provided by the extension 1414. The present invention is not limited to any one way.

It is also noted that in each of the computers just described, the memory shown may include both volatile and nonvolatile components. Volatile components are those that do not retain data upon loss of power. Non-volatile components are those that retain data upon a loss of power.

Thus, each of the memories shown in FIGS. 1–8 may comprise, for example, random access memory (RAM), read-only memory (ROM), hard disk drives, floppy disks accessed via an associated floppy disk drive, compact disk (s) accessed via a compact disk drive, magnet tape(s) accessed via an appropriate tape drive, and/or other memory components (currently known in the art, or yet to be developed), or a combination of any two or more memory components.

In addition, it is also noted that in each of the devices just described, the processor shown may include one or more than one microprocessors. Furthermore, the local interface in each device may include, for example, one or more data buses and accompanying control buses.

Figure 9:
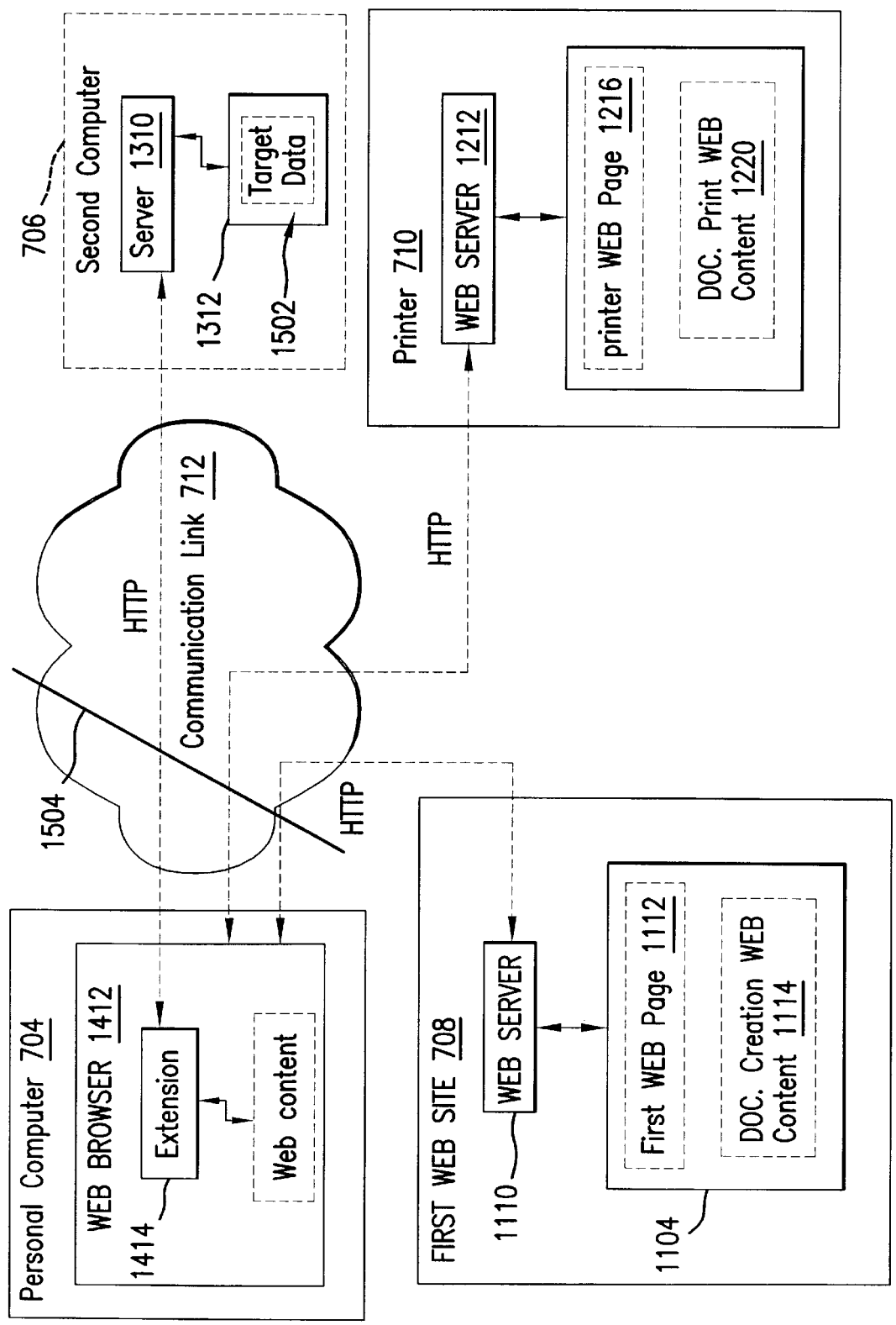
FIG. 9 illustrates how the various software components in the client server system can communicate.

FIG. 9 illustrates how the various software components can communicate over the communication link 712. To illustrate an aspect of the invention, it will be assumed that the personal computer 704 must communicate to the other devices shown through a conventional firewall 1504. The firewall 1504 is used to filter out unwanted communication packets in a conventional manner. Thus, requests may be made by the personal computer 704 to external devices located on the other side of the firewall 1504 and responses to these requests from the external devices are typically allowed. Communications, however, initiated by these external devices to the personal computer 704 are not permitted.

The firewall 1504, however, includes a conventional proxy server (hereafter "firewall proxy") that allows the personal computer 704 to pass HTTP requests to the Web server 1110, the Server 1310 and the Web server 1212. As will be seen, by using the HTTP protocol to traverse the firewall 1504 in this manner, the personal computer 704 is able to make use of the services provided by the first Web site 708 and the printer 710. In addition, the personal computer 704 is able to store target data in the memory 1304 located in the second computer 706. It is important to note that in other embodiments of the invention other communication protocols (either now existing or yet to be developed) can be used.

In response to user input, the Web browser 1412 can request the first Web page 1112 as well as the Document creation Web content 1114 by transmitting appropriate HTTP requests (via the proxy) to the Web server 1110. Similarly, the Web browser 1412, can request the printer Web page 1216 as well as the document print Web content 1220 received from the Web server 1212. The Web browser 1412 can also communicate one or more sets of data (via the proxy) to the server 1310 and can retrieve this data.

Figure 10:
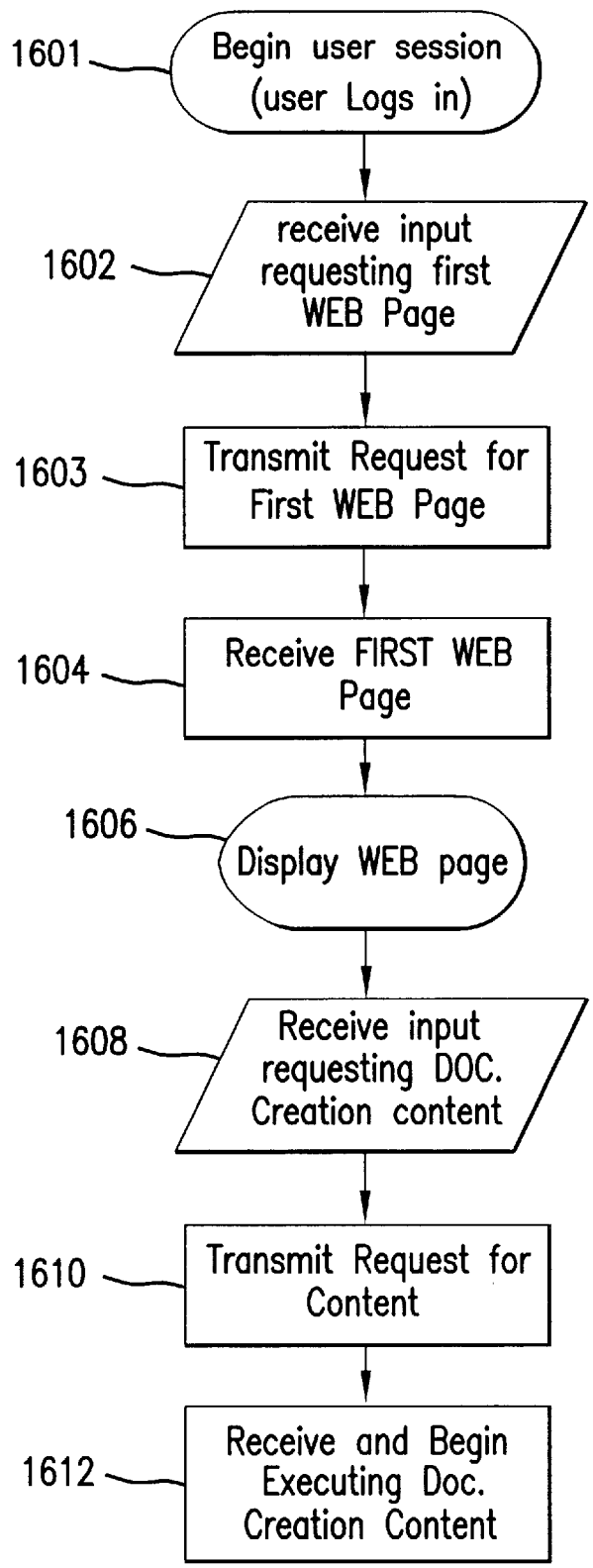
FIG. 10 is a flow diagram illustrating how the personal computer can download first Web content that allows a user to create a document.
Figure 11:
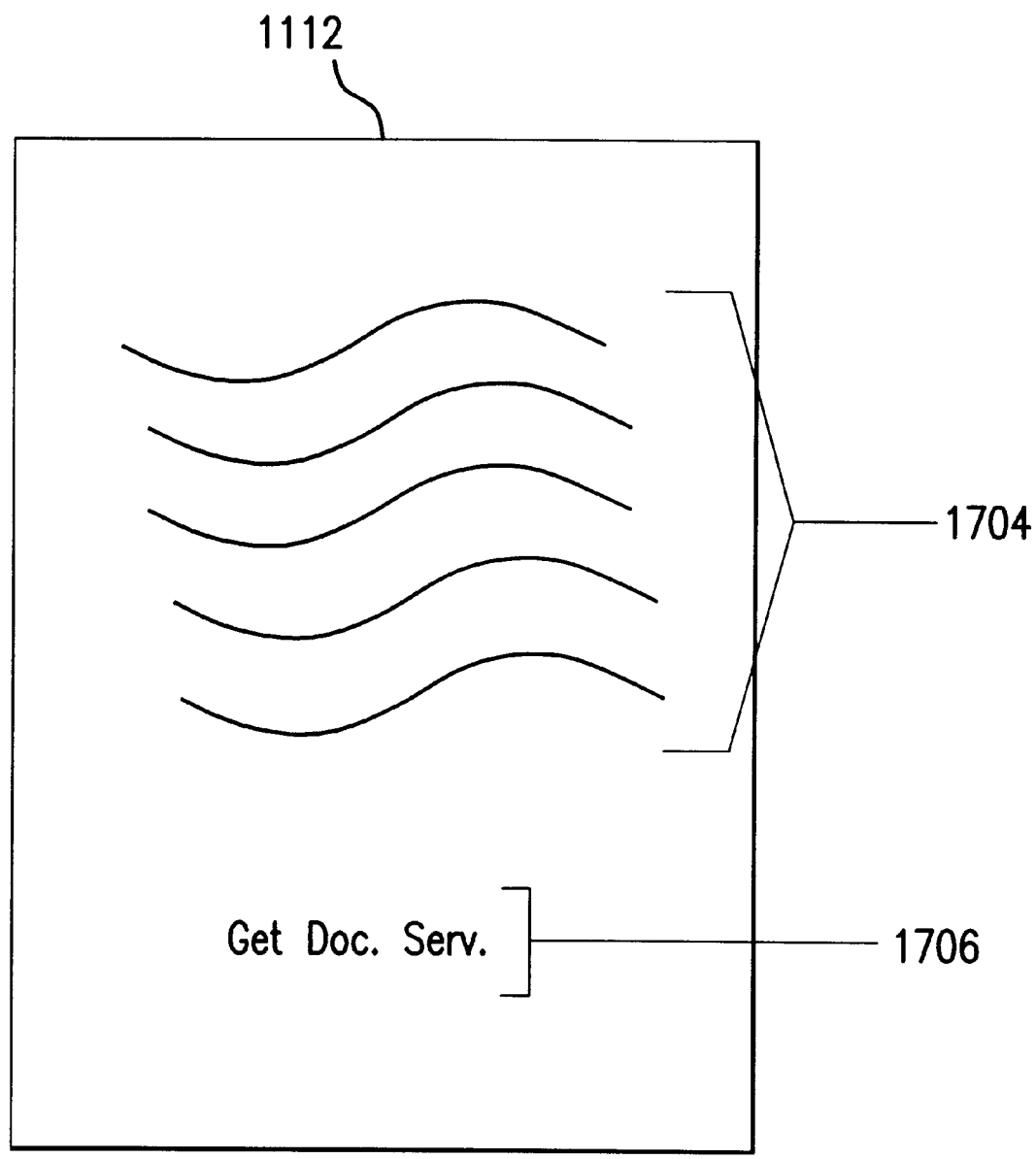
FIG. 11 illustrates a first Web Page that includes a hyperlink to the first Web content.
Figure 12:
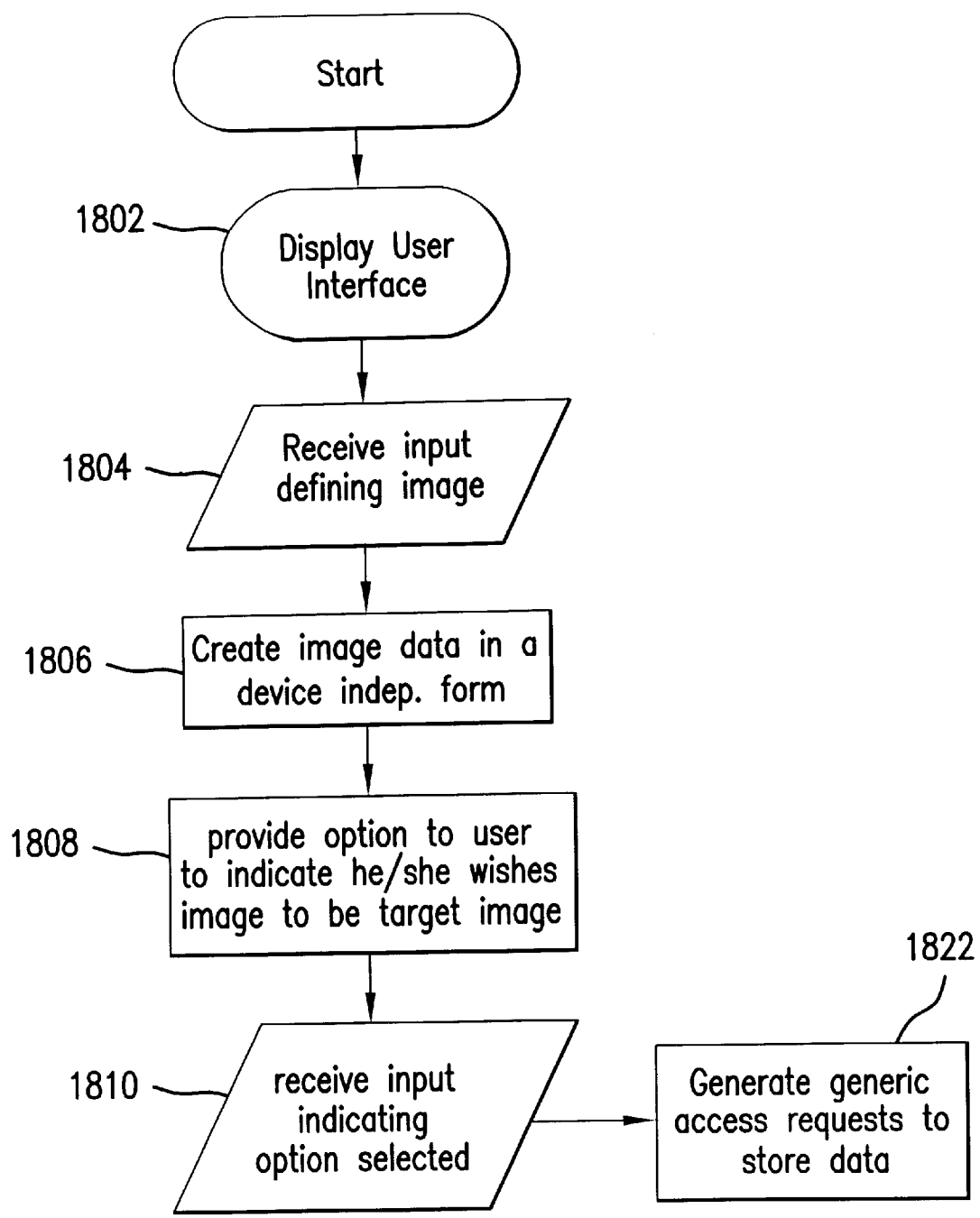
FIG. 12 is a flow diagram illustrating the execution of the first Web content.

FIGS. 10–12 are used to illustrate how a user of the personal computer 704 can make use of the document creation service provided by the first Web site 708.

Referring first to FIG. 10, a user logs into the personal computer 704 and begins a user session (step 1601). In this manner, the user becomes an active user.

Next, the user inputs an appropriate URL for the First Web page 1112. The Web Browser 1412 receives this input at step 1602 and in response transmits (via the firewall proxy) an appropriate request for the page to the Web server 1110 (step 1603).

The Web server 1110 receives the request and responds by transmitting the first Web page 1112 to the Web Browser 1412 (via the firewall proxy).

The Web Browser 1412 receives this response from the Web server 1110 at step 1604 and displays the received first Web page 1112 at step 1606.

FIG. 11 illustrates the first Web page 1112 as displayed by the browser 1412. Referring briefly to FIG. 11, the first Web Page 1112 includes a text portion 1704 and a "get document service" hyperlink 1706. The text portion 1704 may include information regarding the document creation service provided by the first Web Site 708. The hyperlink 1706 is formatted such that, when selected by a user, the Web Browser 1412 transmits an appropriate request to the Web server 1110 for the Document Creation Web content 1114. In other embodiments, the first Web Page 1112 may also display a cost to use the service as well as provide a means for the user to enter payment information (e.g., credit card information) to pay for the service.

Referring again to FIG. 10, it is assumed the user selects the get document service hyperlink 1706 and the browser 1412 receives this input at step 1608. In response to this input, the browser 1412 transmits an appropriate request to the Web Sever 1110 (via the firewall proxy) for the Document creation Web content 1114 (step 1610). The browser 1412 receives and begins executing the Web content 1114 at step 1612.

FIG. 12 illustrates the operation of the Document creation Web content 1114 while being executed at step 1612. Referring now to FIG. 12, the content 1114 causes the display device 716 to display a user interface (step 1802). The user interface accepts input from a user (via the input devices 714) so as to allow the user to define an image.

The Web content 1114 receives these inputs at step 1804 and creates a set of data describing the image (step 1806). In this example, the data is created in a file format that is device independent. That is to say, the data represents the image in a manner that is independent of the Web content, the local operating system and hardware used to generate it. One example of such a format is the format known as "PDF" (Portable Document Format).

Next, the Web content 1114 provides a means for the user to indicate whether he/she wishes the image defined at step 1804 to be saved as a "target image" (step 1808). For example, the user interface displayed at step 1802 may include one or more selectable options or a pull down menu for providing a user a means to indicate this desire.

The Web content 1114 is assumed to receive this indication at step 1810. In response to this input, the Web content 1114 generates generic access requests in order to cause the data generated at step 1806 to be stored (step 1822). The Extension 1414 is responsible for responding to these requests.

Figure 13:
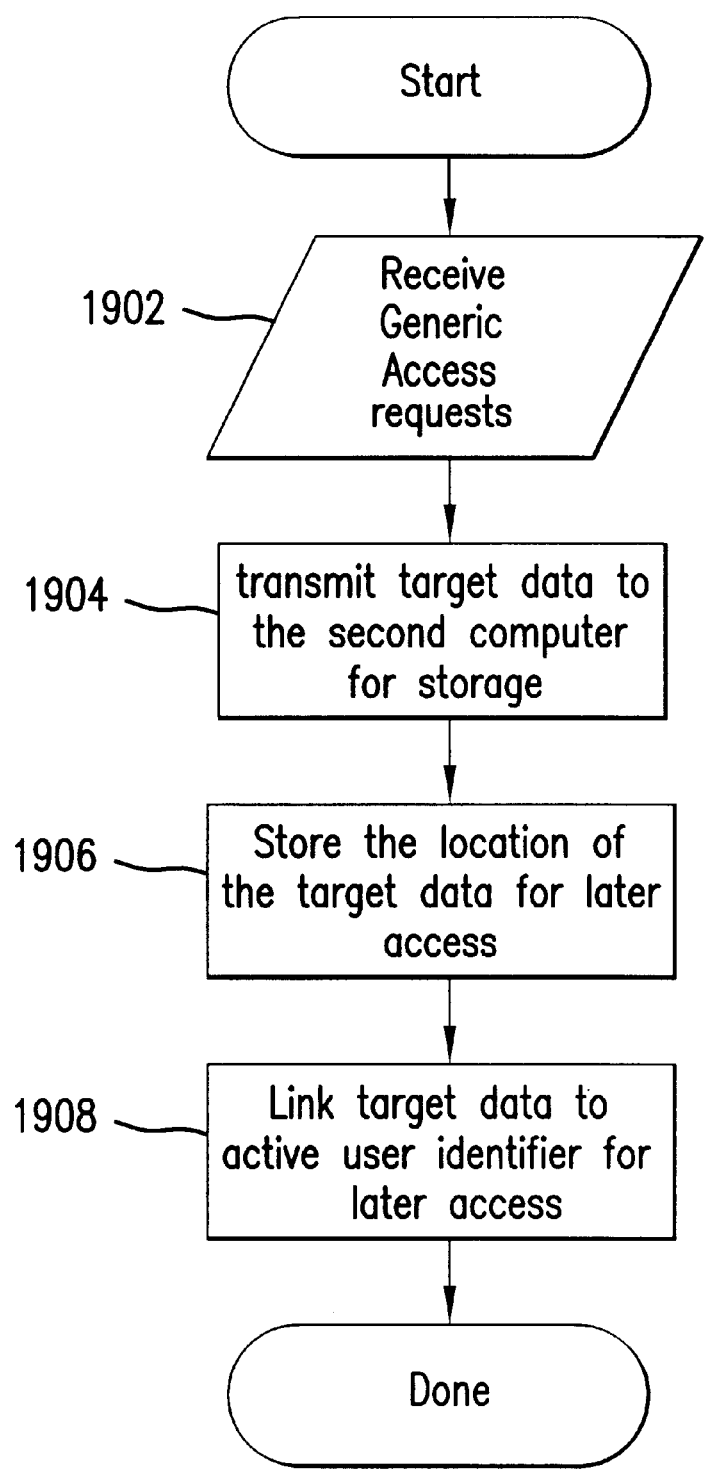
FIG. 13 is a flow diagram illustrating the operation of an extension component in the personal computer.

FIG. 13 is a flow diagram for illustrating the operation of the extension 1414 to respond to the generic access requests generated at step 1822. Referring now to FIG. 13, the extension 1414 receives the generic access requests at step 1902. In response, the extension 1414 causes the target data created at step 1806 to be stored in the reserved storage area 1312 of the second computer 706 (step 1904). This is accomplished by the extension 1414 communicating the target data over the communication link 712 to the server 1310. It is noted that because the HTTP protocol is used, the extension 1414 is able to communicate the target data through the firewall 1504.

The server 1310 responds by storing the target data in the reserved storage area 1312. It will be assumed that the first target data 1502 represents this target data.

In addition to communicating the target data 1502 to the server 1310, the extension 1414 (preferably) also stores the location of the first target data 1502 so that the data can later be accessed (step 1906) and links this location to the active user's identifier (step 1908).

FIGS. 14–22 are used to illustrate how a user of the personal computer 704 can make use of the printing service provided by the printer 710. In this section, it will be assumed that the conditions depicted in FIG. 14 exist.

Figure 14:
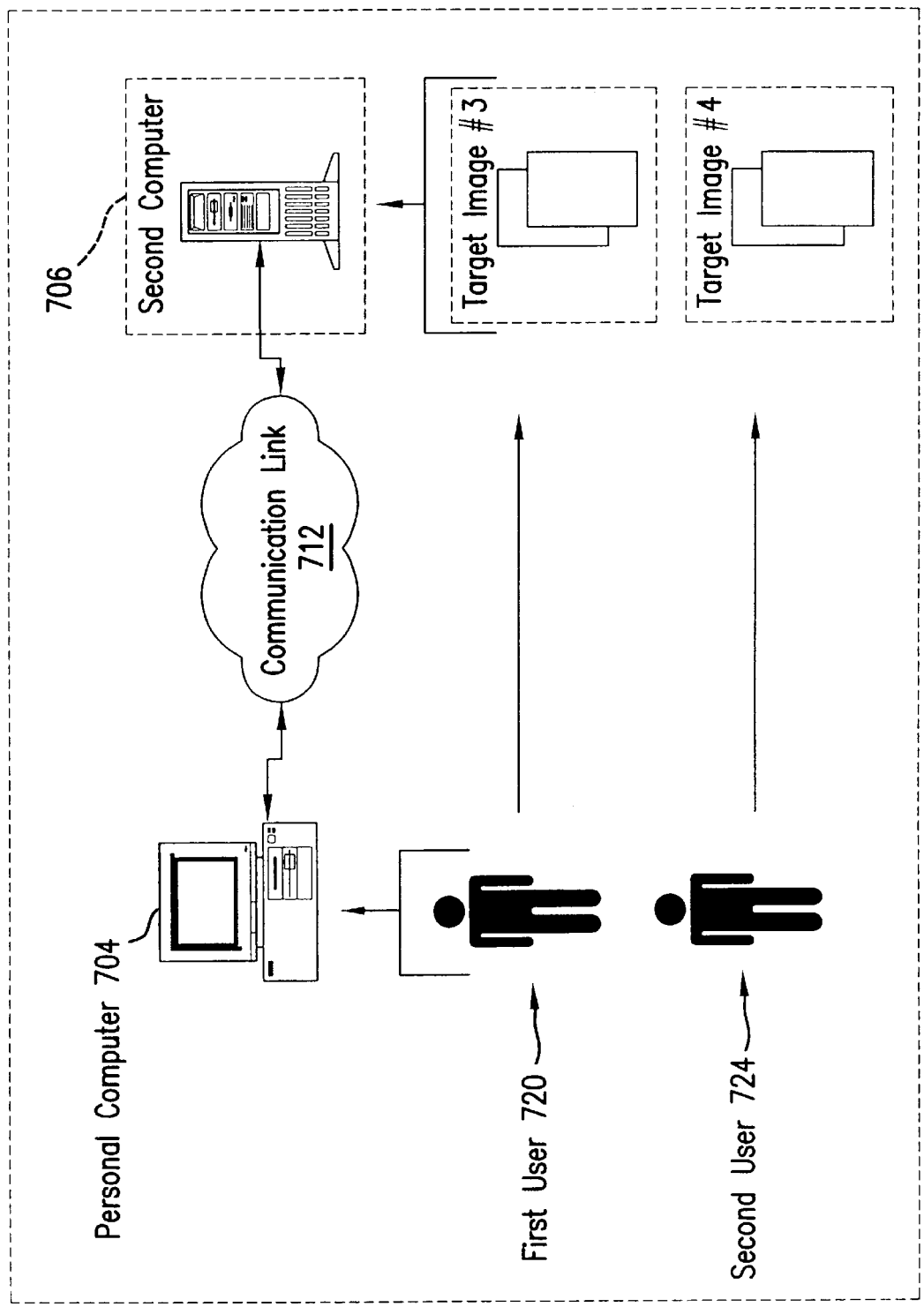
FIG. 14 is used to illustrate, in abstract form, a set of conditions.

As indicated in FIG. 14, the first user 720 has made use of the document creation service to identify a target image (target image #3). The data (target data #3) that describes this image is stored in the internal memory of the second computer 706. Furthermore, the second user 724 has also made use of the document creation service to define a target image (target image #4). The data (target data #4) that describes this second image that is also stored in the internal memory of the second computer 706.

Figure 15:
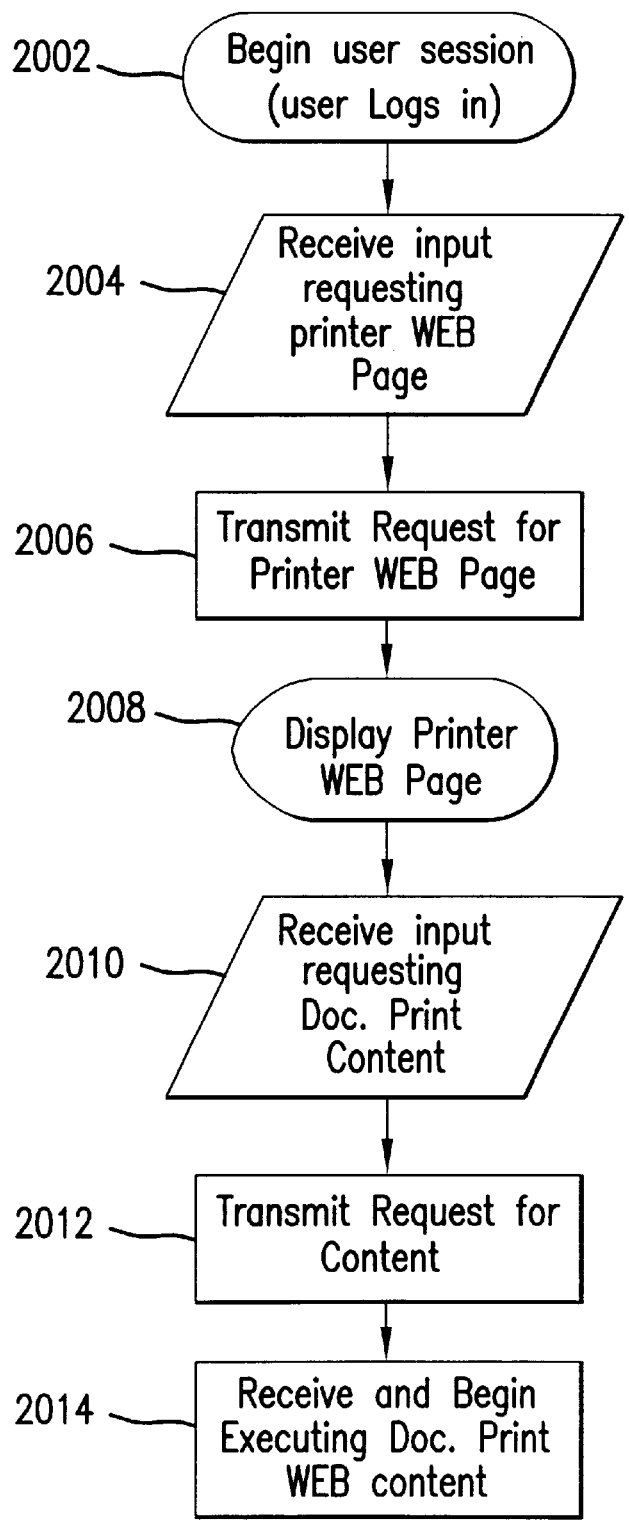
FIG. 15 is a flow diagram illustrating how the personal computer can download second Web content that allows a user to print a document.

Referring now to FIG. 15, one of the two users logs into the personal computer 704 (step 2002) and executes the Web browser 1412. The user is then assumed to provide the URL of the printer Web page 1216. The Web browser 18 receives this input at step 2004.

In response to this input, the Browser 1412 transmits an appropriate request to the Web Server 1212 for the Printer Web page 1216.

The Web server 1212 receives this input and responds by transmitting the printer Web page 1216 to the Web Browser 1412.

The Web Browser 1412 receives and displays the printer Web page 1216 at step 2008.

Figure 16:
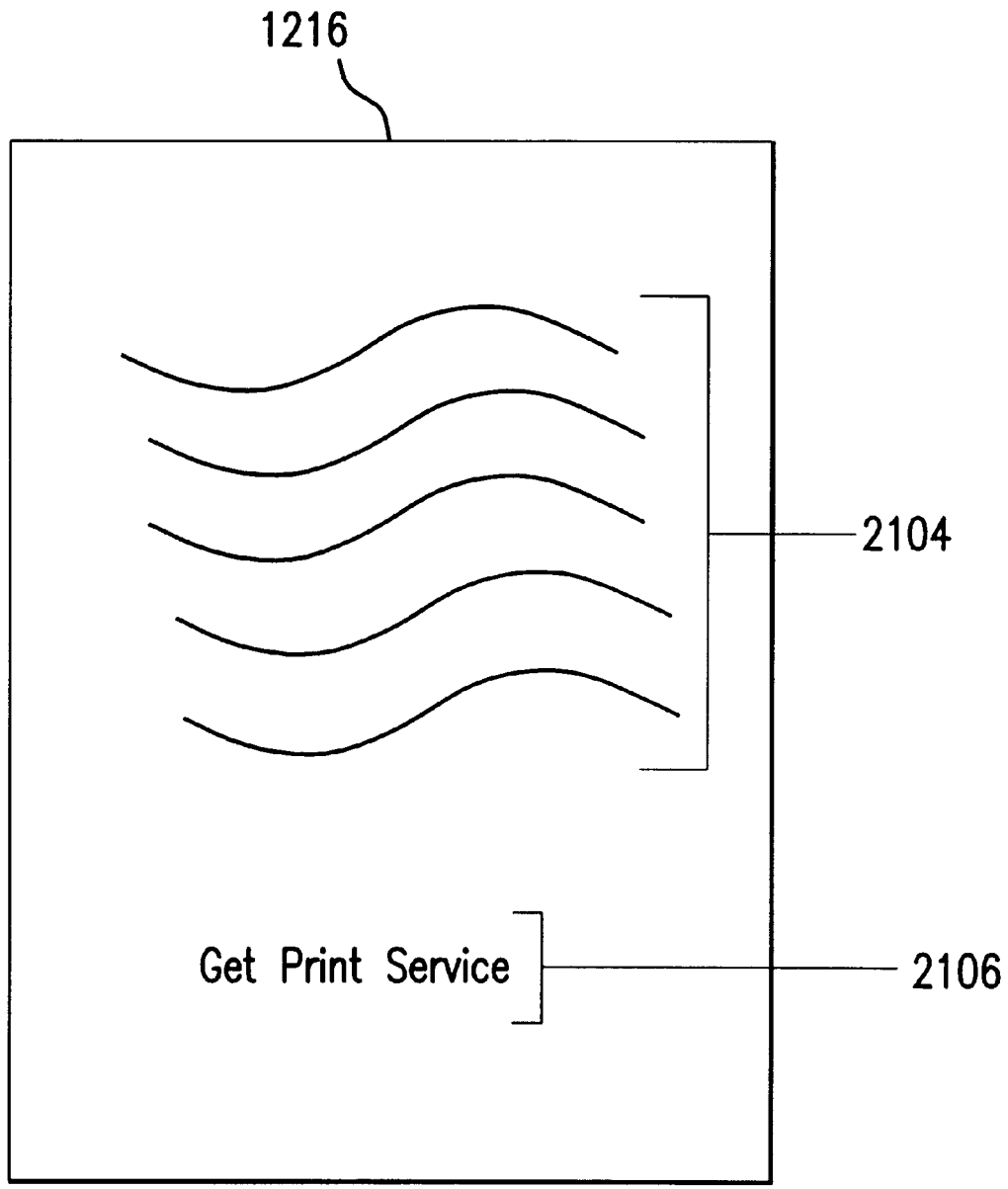
FIG. 16 illustrates a second Web Page that includes a hyperlink that to the second Web content.

FIG. 16 illustrates the printer Web page 1216 as displayed by a browser. Referring briefly to FIG. 16, the printer Web page 1216 includes a text portion 2104 and a "get document print service" hyperlink 2106. The text portion 2104 may include information regarding the document printing service provided by the printer 710. The hyperlink 2106 is formatted such that, when selected by a user, the Web Browser 1412 transmits an appropriate request to the Web server 1212 for the Document print Web content 1220. In other embodiments, the printer Web page 1216 may also display a cost to use the printing service and may provide the user with a means to enter payment information to make use of the service.

Referring again to FIG. 15, it is assumed that the user selects the get print service hyperlink. The Web Browser 1412 receives this input at step 2010 and in response transmits a request for the Web content 1220 to the Web server 1212.

The Web server 1212 receives this input and responds by transmitting the Document Print Web content 1220 to the Web browser 1412.

The Web Browser 1412 receives the print Web content 1220 and begins executing it at step 2014.

Figure 17:
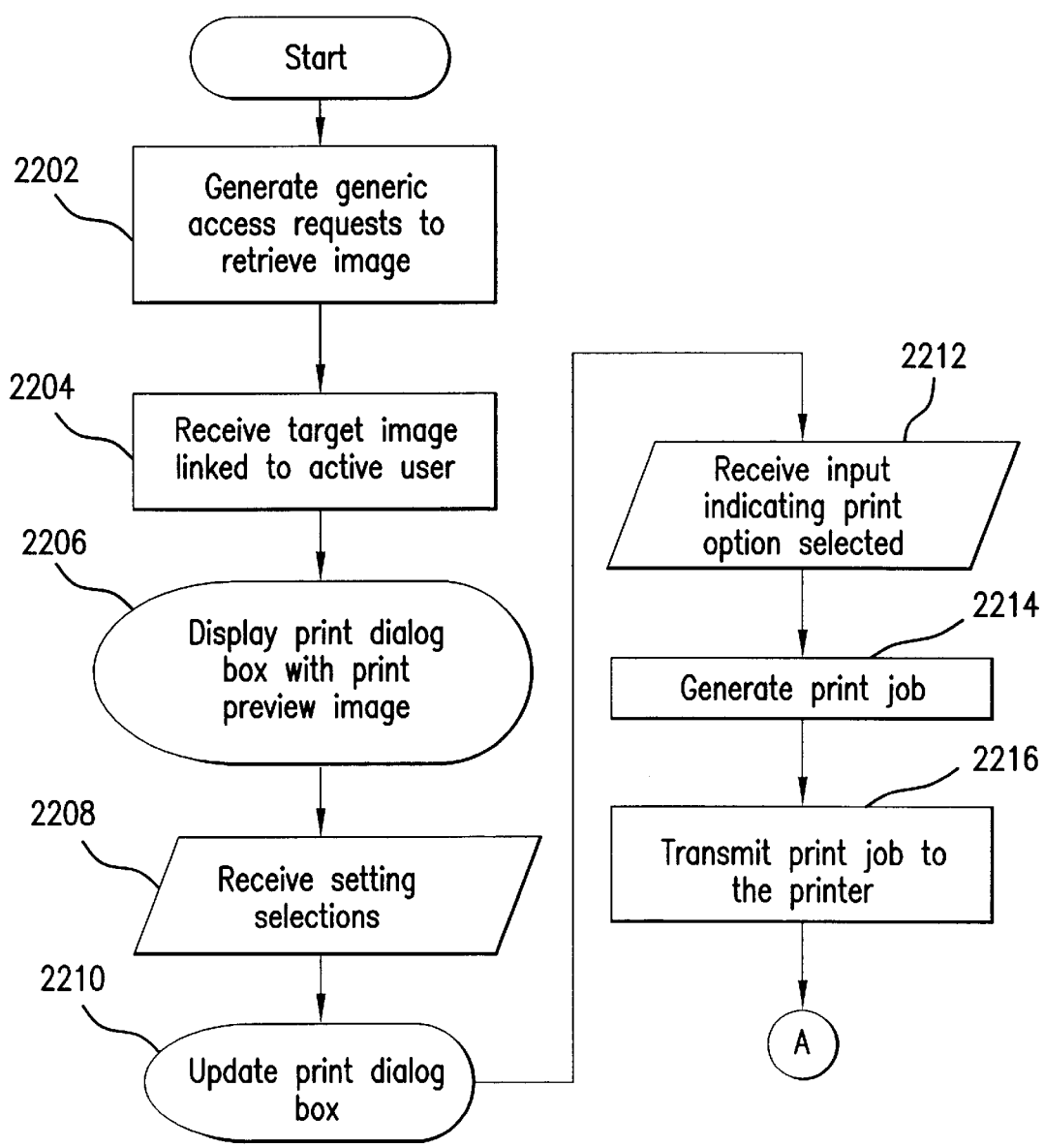
FIG. 17 illustrates the execution of the second Web content.
Figure 18:
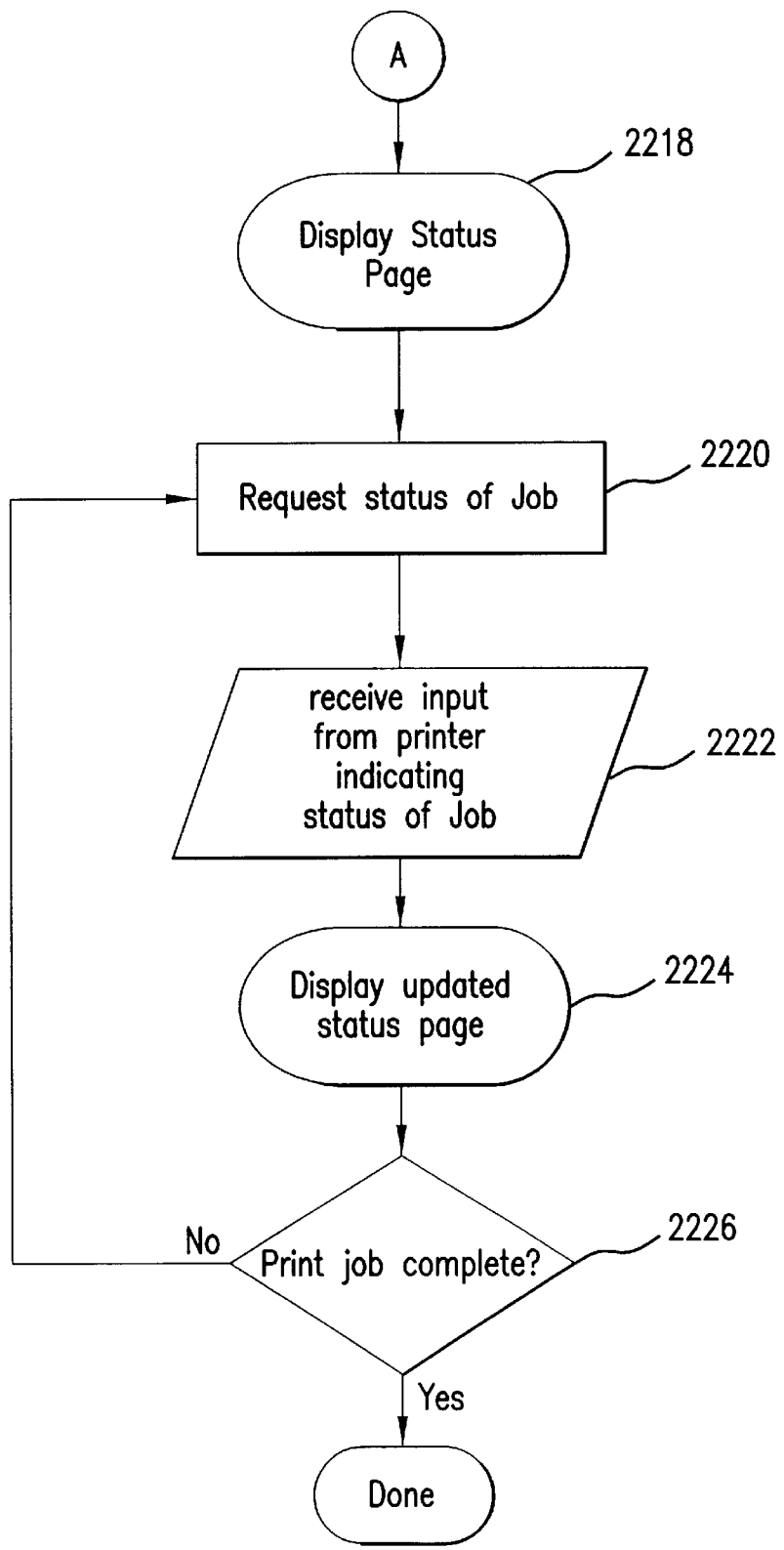
FIG. 18 illustrates an operation of a Web content from a target Web service.

FIGS. 17 and 18 illustrate the operation of the print Web content 1220 (while being executed at step 2014). First, print Web content 1220 causes generic access requests to be generated in order to retrieve a target image (step 2202).

Figure 19:
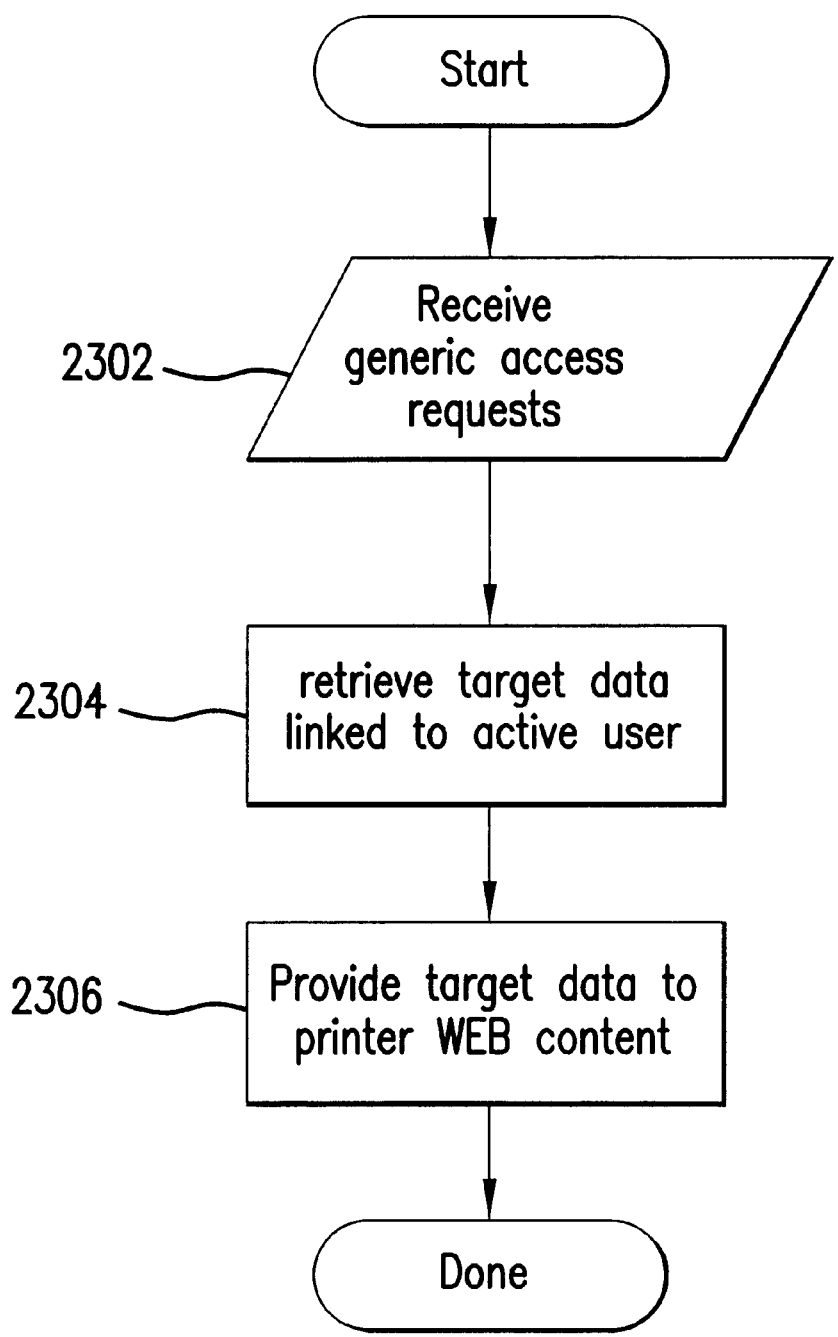
FIG. 19 illustrates further the operation of the extension component in the personal computer.

FIG. 19 illustrates the operation of the extension 1414 to respond to the generic access requests generated at step 2202. Referring briefly now to FIG. 19, the extension 1414 receives these generic access requests at step 2302. In response, the extension 1414 retrieves the set of target data that is linked to the active user (step 2304). (It is noted that in other embodiments, generic access requests may define a format for the retrieved data. This desired format is then communicated to the server and the server provides the target data in the desired format. Importantly, the desired format may be different than the originally stored format. Thus, for example, the set of target data may be stored as a PDF format and returned, for example, in a JPEG format. This may be advantageous in situations wherein a second form of the target data is better suited for printing, displaying, etc).

It can be seen that, for example, if the first user 720 is presently logged into the personal computer 704, the extension 1414 responds by retrieving target data #3 (stored in the second computer 706). This is accomplished by transmitting appropriate HTTP requests for this data to the server 1310. The server 1310 responds by transmitting this data to the extension 1414. Conversely, if the second user 724 is presently logged into the personal computer 704, the extension 1414 responds by retrieving the set of target data #3.

The extension 1414 then operates to provide the retrieved target data to the Document Print Web Content 1220 in an appropriate manner (step 2306).

Referring again to FIG. 18, the Web content 1220 receives the retrieved target data (from the extension 1414) at step 2204. In response, the Web content 1220 causes the personal computer 704 to display a print dialog box with a print preview image (step 2206).

Figure 20:
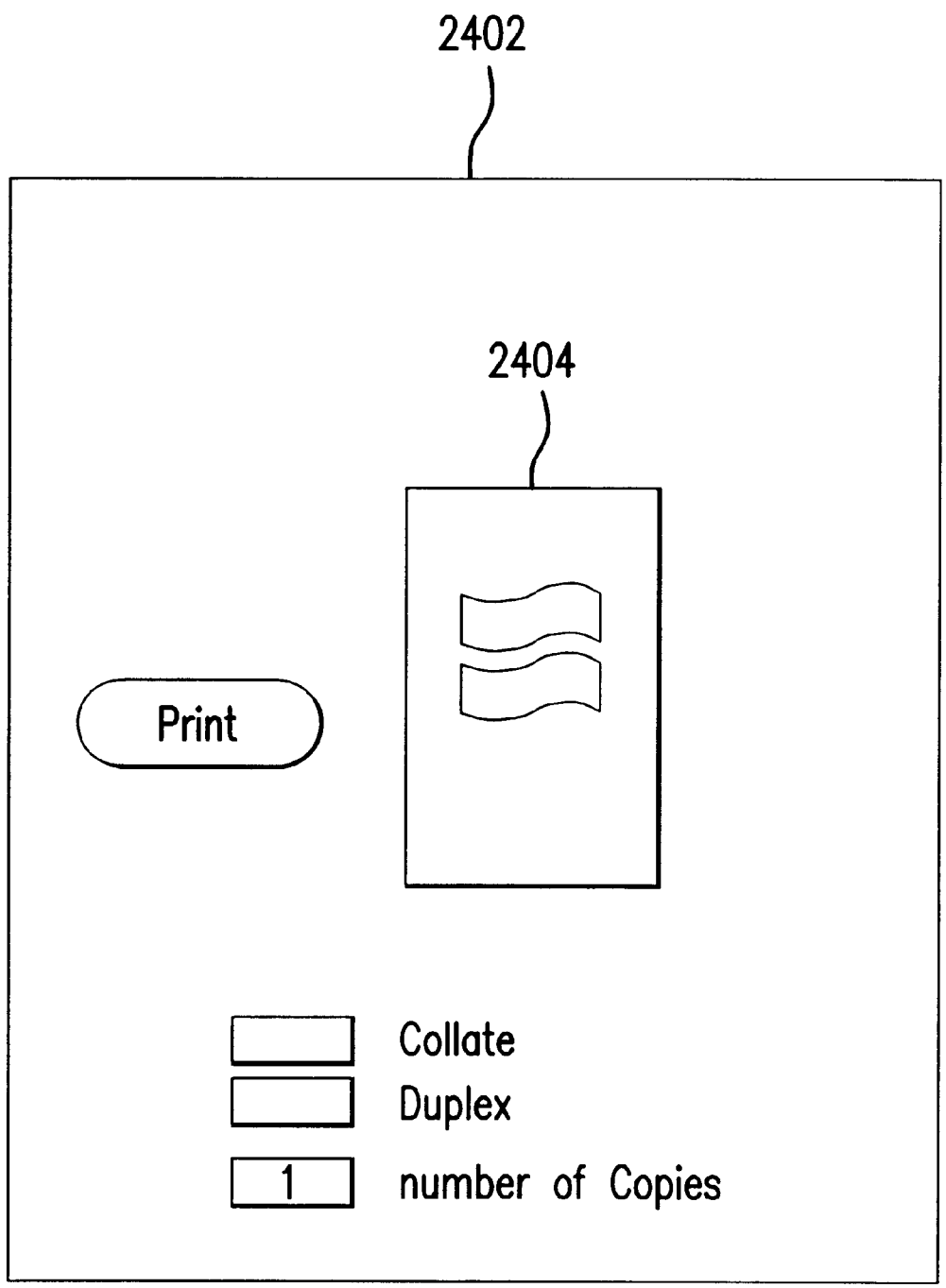
FIG. 20 illustrates an exemplary print dialog box.

FIG. 20 illustrates an exemplary print dialog box 2402 that may be displayed by the personal computer 704 at step 2206. As shown, the dialog box 2402 displays a print preview image 2404 that allows the user to define particular print settings. In this example, the print dialog box 2402 allows the user to enter the number of copies, select a duplex option and/or a collate option.

Importantly, these options are based upon the capabilities of the printer 710. The print preview image that is displayed is based, in part, upon the retrieved target image (i.e., the target image #3 or the target image #4) as well as the options selected.

Referring again to FIG. 17, the Web content 1220 is assumed to receive the user input indicating that certain settings have been selected at step 2208 and updates the dialog box 2206 accordingly.

Figure 21:
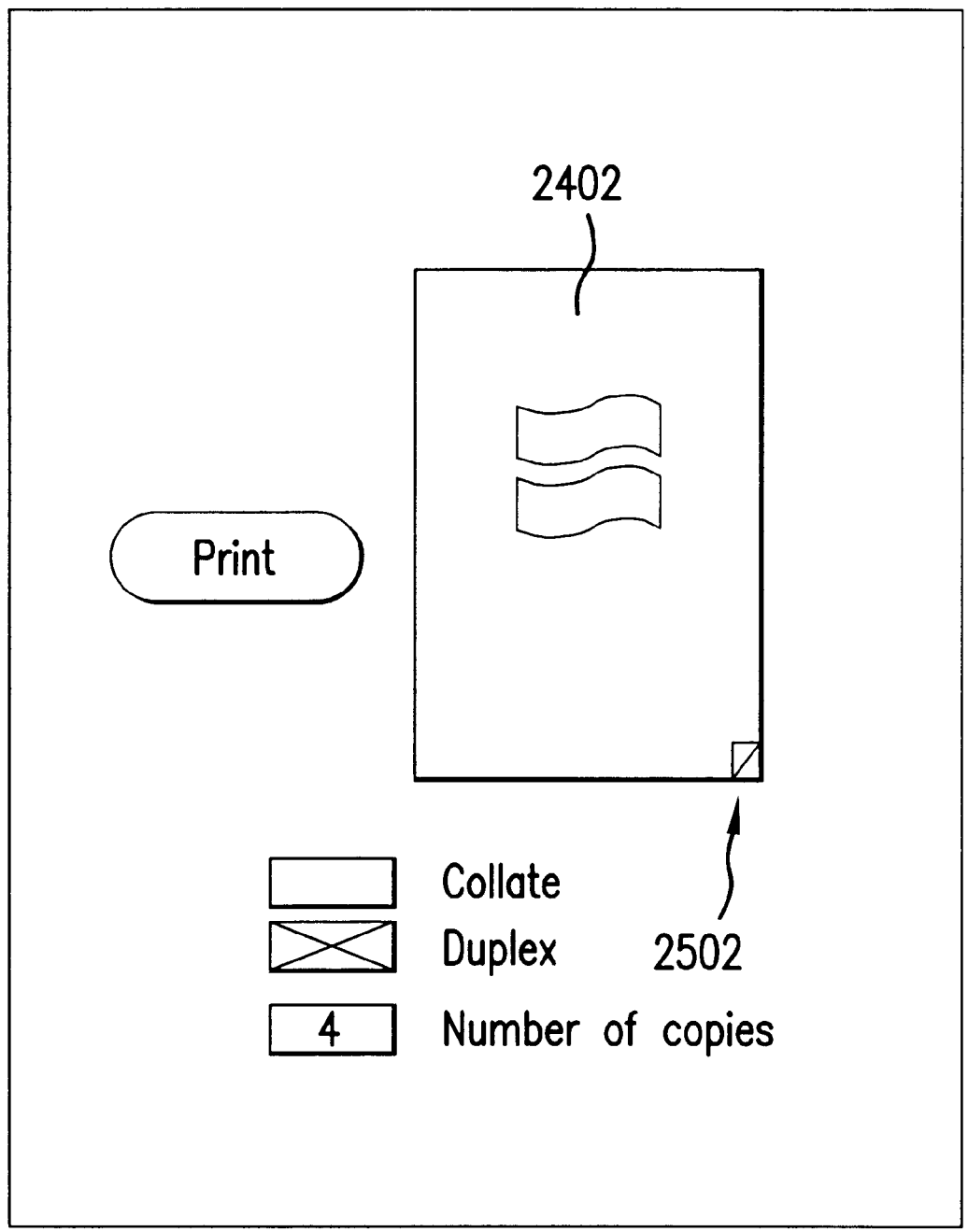
FIG. 21 illustrates the print dialog box after being updated.

FIG. 21 illustrates how the print dialog box 2402 would be updated assuming that the user has selected the duplex option and has entered "4" as the number of copies he/she wishes printed. It is noted that the print pre-view image reflects the duplex option by an icon 2502.

Referring once again to FIG. 17, it is assumed that Web content 1220 receives input indicating the user has selected the print button 2410. The Web content 1220 responds to this input by generating a print job and by transmitting the print job to the Web server 1212 (steps 2214 and 2216). The print job includes the target data and also includes commands that cause the printer 710 to print the image according to the inputted settings.

The Web server 1212 receives the print job and provides the print job to the printer control program 1222. The printer control program 1222 commands the print engine 1208 to print the target image according to the settings described by the print job.

After the print job is transmitted to the printer, the Web content 1220 displays a "print status page" that shows the status of the print job in a dynamic fashion (step 2218). This is accomplished by the Web content 1220 obtaining certain status information from the printer 710 regarding the printing of the print job (step 2220).

It is noted that the step 2220 may be accomplished by using a number of techniques. For example, PML (Peripheral Management Language) polling may be used. Optionally, the techniques taught in the pending application entitled "Method and Apparatus for Providing Print Job Status, may be used. That application is assigned the attorney Docket number 10001724 and was filed Nov. 1, 2000. That application is incorporated herein entirely by reference.

As the status information is received (step 2222) back from the printer 710, the Web content 1220 updates the status page so as to reflect the updated information (step 2224). This process continues until the print job is completed (step 2226).

Figure 22:
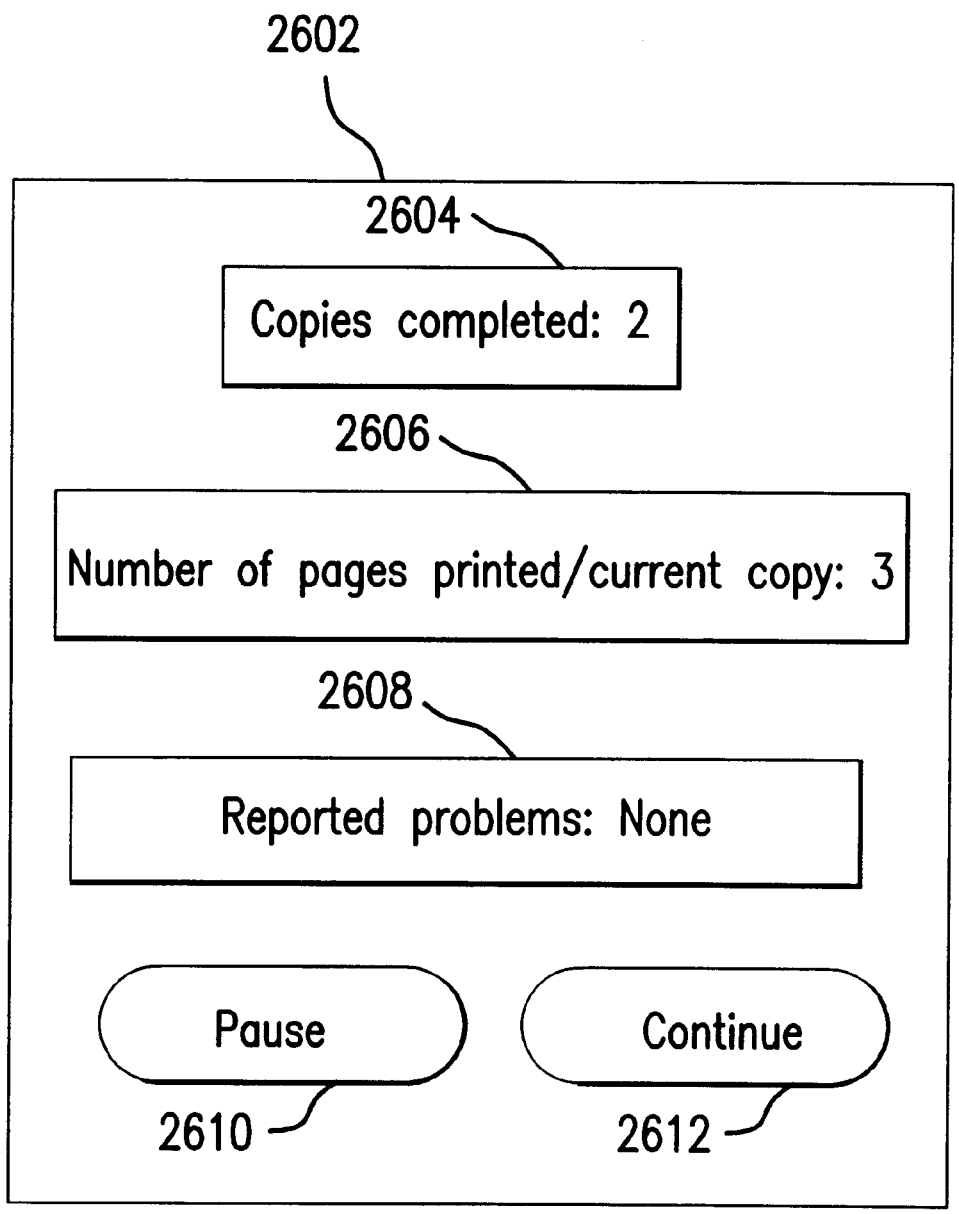
FIG. 22 provides an example of a status page.

FIG. 22 provides an example of a status page 2602 that may be displayed at step 2218. As shown, the status page 2602 includes a first field 2604, a second field 2606 and a third field 2608. The first field 2604 displays the number of copies that has been printed. The second field 2604 displays the number of pages printed for the copy that is presently being printed.

The third field 2608 describes certain problems with the current print job encountered during printing. For example, if the printer 710 reports that a paper jam has occurred, this information can be displayed in this third field.

Additionally, the status page 2602 includes a pause button 2610 and a continue button 2612. If the pause button 2610 is selected, the Web content 1220 sends an appropriate message to the Web server 1212 indicating that the printing of the present job should be paused.

The Web server 1212 receives this message and communicates it to the printer control program 1222. The control program 1222 responds by pausing the printing of the present print job.

After the pause button 2610 has been selected and the printing of the present print job has been paused, a user can then select the continue button 2612. When the continue button is selected, the Doc. Print Web content 1220 sends an appropriate message to the Web server 1212 indicating printing should be resumed.

The Web server 710 receives this message and communicates it to the printer control program 1222. The control program 1222 responds by causing the printing of the present print job to resume.

Figure 23:
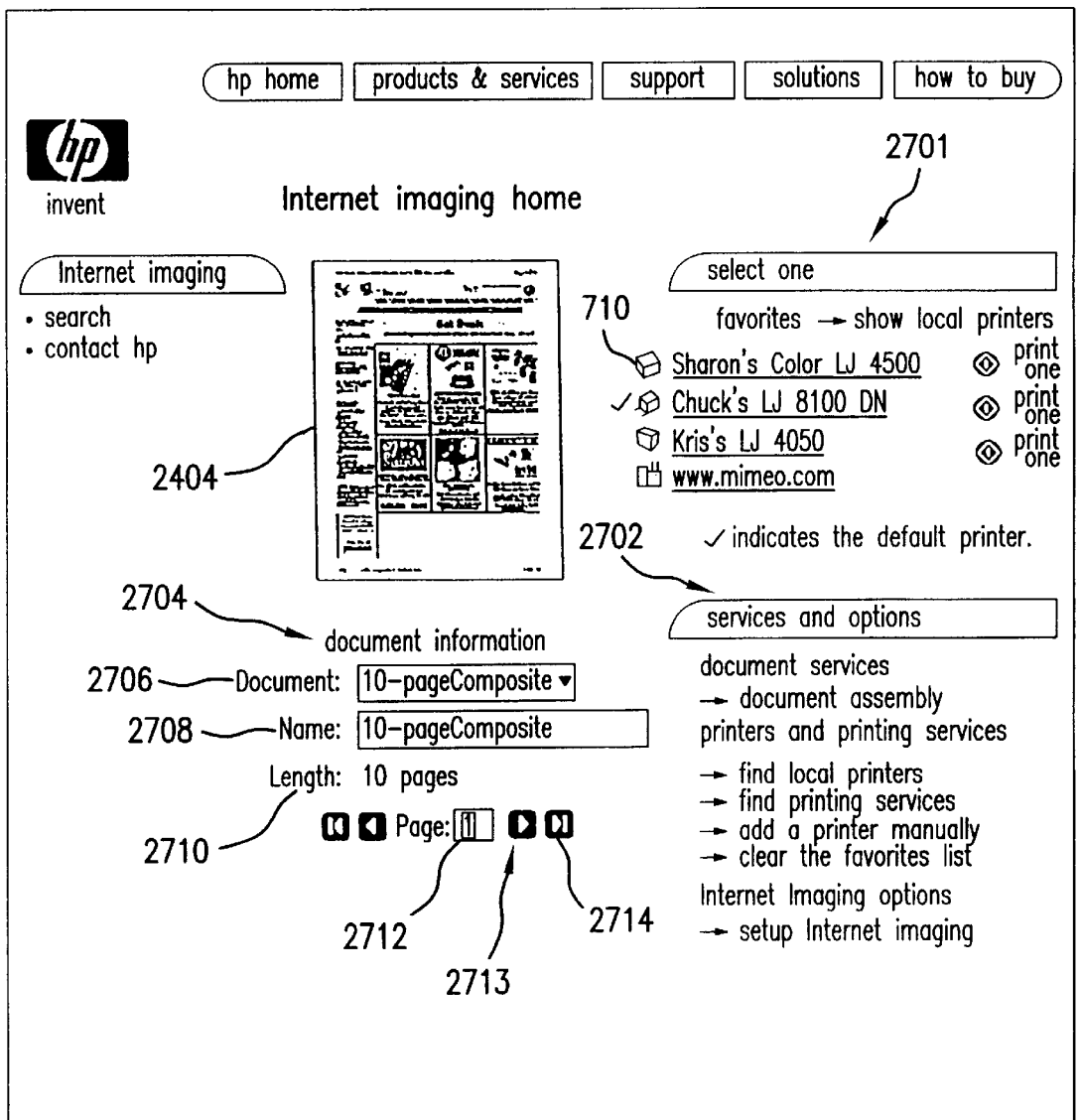
FIG. 23 illustrates a more detailed view of the Web imaging home page.

With respect to FIG. 23, there is illustrated a more detailed example of an Internet imaging home page or print dialog box 2402 that is displayed by a personal computer 704 (FIG. 7) and is responsible for helping the user locate various other Web-based imaging devices and services, such as printer 710 (FIG. 7) and services and options section 2702. As shown, home page 2402 displays a print preview image 2404 that allows the user to preview the print image.

Also, document information section 2704 is illustrated. Section 2704 includes, but is not limited to, document selector menu (2706), document name (2708), document length (2710), and a document page shuttle controls (2713). Shuttle controls 2713 allow the user to shuttle back and forth through the document by activating the page number control 2714. The particular page number as shown in section 2704 is illustrated by display 2712. Document length 2710 is used to determine if the target printer has enough consumables readily available to it to complete the print job.

With respect to the services and options section 2702, various services and options can be made available to the user. Included in section 2702 under document services is a document assembly service. The document assembly service 2702 allows documents stored in the user's personal imaging repository (accessed through the "documents" drop down menu on FIG. 23) to be combined in order to create a new composite document. The document assembly service 2702, preferably, is running locally (perhaps even on the user's own computer).

With respect to the printers and printing services, the user may be able to select the choices of finding the local printers, finding print services, adding a printer manually to the list 2701 of favorites, and clearing the favorites list 2701. These would be very helpful services if, for example, the user does not have access to a printer which is capable of printing the document due to the length of the document and the amount of consumables the document requires to be printed.

Finally, with respect to the options portion of the services and options section 2702, this option would allow the user to interact with client-server system previously described.

It is to be understood that the various services and options shown in dialog box 2402 are for illustrative purposes only. Those skilled in the art would recognize that many other services and options could be shown in dialog box 2402 and, therefore, would be able to be utilized by the user.

Figure 24:
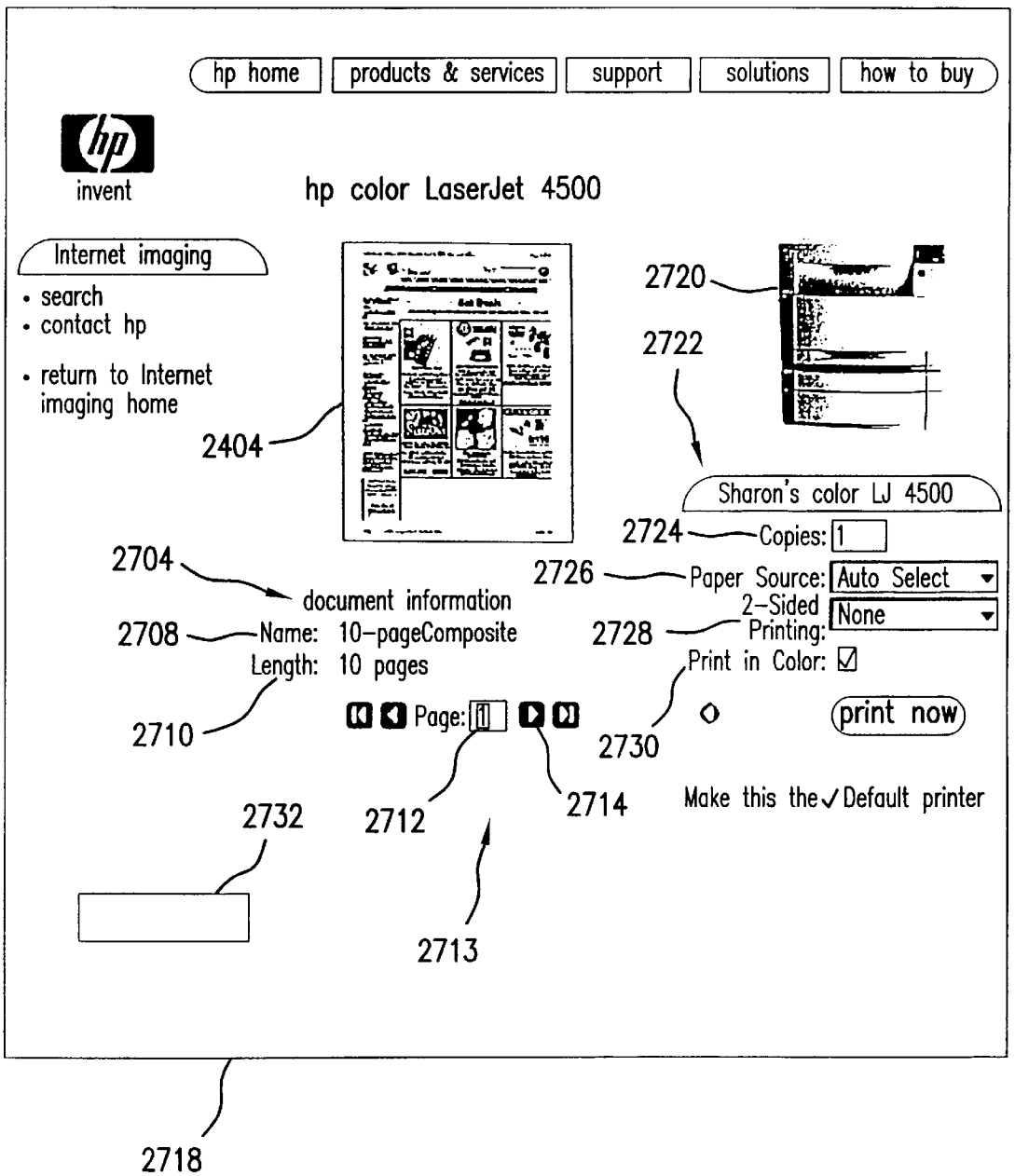
FIG. 24 illustrates a home page for the target printer.

After the user has reviewed the document or print preview image 2404, the user can select a printer 710 to print the document. This is done by selecting a printer (left clicking a mouse conventionally connected to computer 704 (FIG.1)). Selecting a printer (by clicking on the hyperlink link to the printer's web page) directs the web browser to download the target printer web page 2718, as shown in FIG. 24, from the server 1212 representing the printer. The target printer web page 2718 is constructed by the server 1212 (FIG. 9) to represent the features and capabilities of printer 710. Target printer web page 2718 comprises information about the capabilities of printer 710, such as the maximum number of pages per minute printer 710 is capable of printing. The user can interact with target printer web page 2718 to select available print options, such as the number of copies desired. The configuration of these options is available to target printer web page 2718. Additionally, target printer web page 2718 can access information related to the document using the browser extension, such as the number of pages. The target printer web page 2718 determines whether or not the target printer has adequate resources to print the target document using its intrinsic knowledge of the capabilities of printer 710, the currently selected print options, and information about the document. For example, if printer 710 had an output bin with a capacity of two hundred pages, the document consisted of fifty pages, and the user requested five copies, target printer web page 2718 might determine that the printer is unable to complete printing the document to printer 710 with the requested print options. Any variety of information about the document, user print configurations, and printer configuration may be used in determining if printer 710 is capable of printing the document.

Printer configuration information statically contained within target printer web page 2718 might non-exhaustively include the maximum capacity of paper trays, the maximum capacity of output bins, and the maximum number of staples available. Printer configuration information can also be dynamically obtained from printer 710 by target printer web page 2718, such as the actual amount of paper available in various paper trays, the actual amount of paper stored in various output bins, the amount of various toner, the amount of various ink, and the wear remaining on serviceable parts within the printer. Sensors in the printer provide the dynamic configuration information.

User print configuration might non-exhaustively include settings related to copies, duplexing, stapling, collation, paper tray selection, bin selection and other print configuration settings that impact the utilization of resources used in processing the job.

Information about the document might non-exhaustively include number of pages, presence of color, kind of color present, page coverage, amount of raster coverage, dimensions of pages, thumbnail bitmaps of pages, and other renditions of the imaging data comprising the document.

Once the calculation has been performed, the result of the calculation is preferentially displayed to the user.

It is to be understood to one skilled in the art that many different kinds of display/warning/alarm devices can used in place of display 2732. For example, a green/yellow/red light system may be employed in which the various lights signify the ability of printer 710 to complete the print job. Also, a sound/alarm device could be utilized which, again, would provide an indication if, for example, printer 710 could not complete the print job.

Display 2732 is used to provide feedback to the user from printer 710 as to whether or not printer 710 can complete the print job as desired. For example, display 2732 can show the user that the print job cannot be completed by displaying an error message stating that printer does not have enough paper to complete the print job. In another example, display 2732 may remain blank if printer 710 is capable of completing the print job.

Although the calculation of whether or not the document can print has been described as being preferably performed by target printer web page 2718, alternatively information available to the target printer web page 2718 used in making this calculation can be transferred to another location which performs the calculation and returns the results of the calculation to target web page 2718. The location performing the calculation might possess additional data and logic enabling a more accurate calculation. For example, the information available to the target printer web page 2718 might be transferred to printer 710, which simulated the printing process using actual firmware to determine the resource requirements required to print the document.

If the user selects another printer, printing device or printing service, browser 1412 interacts with the server of the other printer, printing device or printing service in the same manner, as discussed above. The server connected to that printer, printing device or printing service will relate information to the user regarding the capabilities of that other printer, printing device or printing service by way of the target printer's web page.

FIG. 24 shows an example of a home page 2718 for a target printer. In this case, the target printer is printer 710. As can be seen, home page 2718 includes, in part, print preview image 2404, document information section 2704, and display 2732. Section 2704 includes, but is not limited to, document name (2708), document length (2710), and a document page shuttle controls (2713). Shuttle controls 2713 allow the user to shuttle back and forth through the document by activating controls 2714.

An illustration 2720 of the type of printer to be used is provided. In this case, printer 710 is illustrated. A section 2722 is provided that includes, but is not limited to, the number of copies to be made (2724), the paper source (2726), duplexing capabilities (2728), color printing (2730), and a print button (2710). Section 2722 allows the user to select the number of copies to be printed at 2724 by conventionally typing in and/or using the mouse of computer 704(FIG. 7) (for example) to select the desired number of copies. Also, the paper source 2726 can be selecting by using the mouse (for example) to select the desired paper source. Also, the user can opt for having the document duplexed by using the mouse (for example) at 2728. Also, the user can choose to have the document to be printed in color by clicking the mouse (for example) on the box at 2730. Again, for example, document length (2710), color copies, two-sided printing, and the number of copies to be made (2724) may be used to determine if printer 710 can complete the print job based upon the amount of consumables available to printer 710.

It is to be understood that some of the various options on home page 2718 will only be shown if the sensors on printer 710 detect that these features, print media, print color and the like are available on printer 710. Once the user is satisfied with the print preview, as evidenced by print preview image 2404 and the capabilities of printer 710 to complete the print job, the user merely clicks the mouse (for example) on button 2410 and the document will be printed by printer 710.

Display 2732 is used to provide feedback to the user from printer 710 as to whether or not printer 710 can complete the print job as desired. For example, display 2732 can show the user that the print job cannot be completed by displaying an error message stating that printer does not have enough paper to complete the print job. In another example, display 2732 may remain blank if printer 710 is capable of completing the print job.

Display 2732 could also be used to show characteristics of the document to be printed. These document characteristics being, but not limited to, document name, document length, document image, monochrome or color document or the like. At least one of these characteristics should be displayed on target printer home page 2718 so that the user can identify the document to be printed.

It is to be understood to one skilled in the art that many different kinds of display/warning/alarm devices can used in place of display 2732. For example, a green/yellow/red light system may be employed in which the various lights signify the ability of printer 710 to complete the print job. Also, a sound/alarm device could be utilized which, again, would provide an indication if, for example, printer 710 could not complete the print job.

Figure 25:
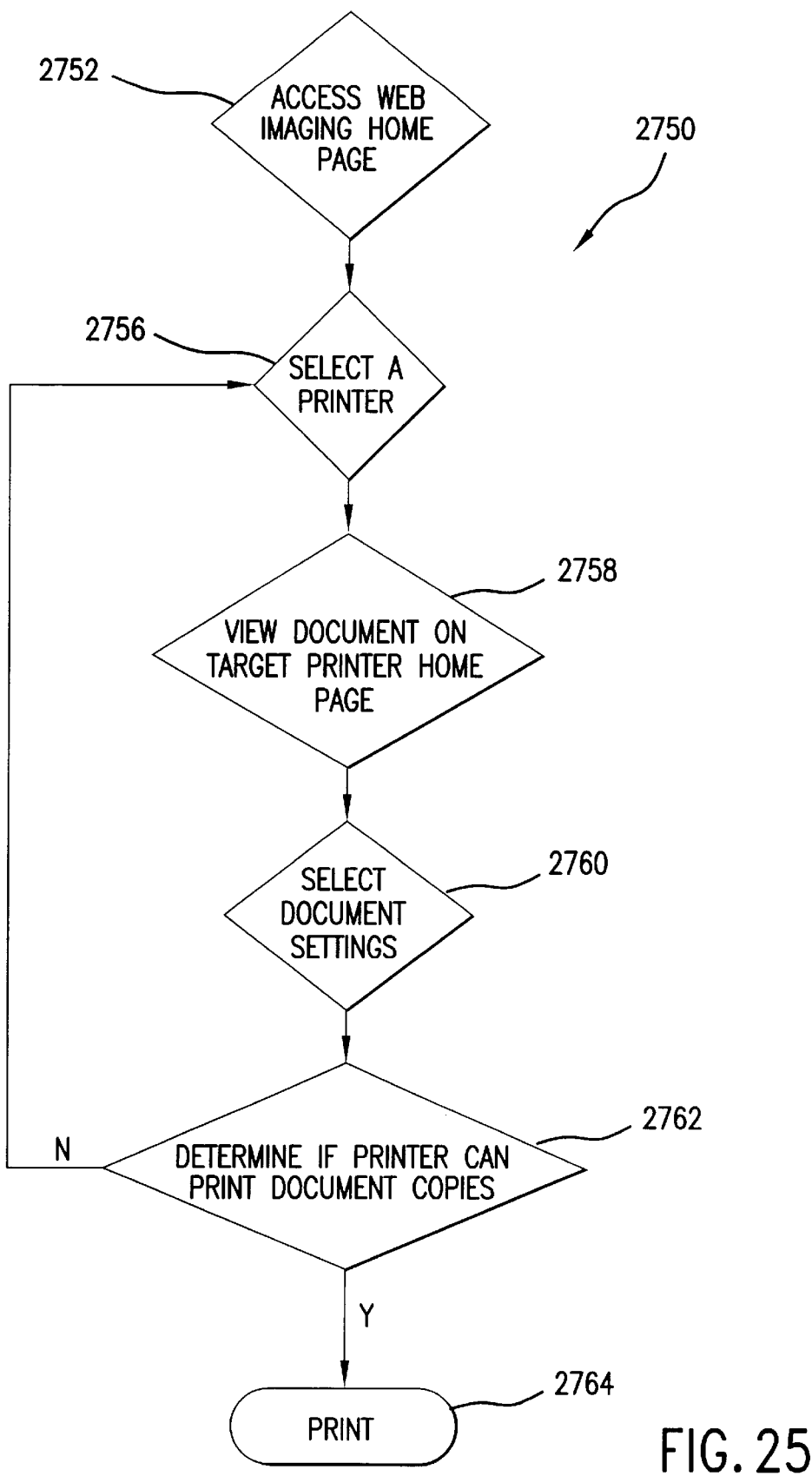
FIG. 25 is a flow chart that illustrates how the print job assurance system operates.

FIG. 25 shows the operation of the print job assurance method 2750 of the present invention. Method 2750 includes, in part, the steps of selecting a document to be printed, as shown in step 2752. The document can be selected from a variety of sources, as previously discussed. After the document is selected, the user can select the printer to print the document, as shown in step 2756. After the printer has been selected, the user can view the document to be printed on the target printer home page, as shown in step 2758. The user can select the document settings of the document that will be printed, as shown in step 2760. The document settings can be, but are not limited to, color versus monochrome, number of pages, number of copies, stapling, duplexing or the like. The target printer home page will provide a preview of the document to be printed and, if necessary, information regarding the ability of the target printer to complete the print job, as shown in step 2762. Finally, once the user is satisfied with the print preview of the document and the number of copies of the document to be printed, the user merely clicks the mouse (for example) on the print button 2410 and the document is printed, as shown in step 2764.

In short, the basic idea of the present invention is for the Web content to access information about the selected document in the user's personal imaging repository and use this information (along with information about the target printer and information about selected settings) to determine if printer 710 can complete the print job, as desired. The personal imaging repository makes this particularly easy since it can provide information like the number of pages, whether any of the pages contain color, and thumbnail images 2404 of each page.

The thumbnail images 2404 are normally used to provide a preview to the user, but these same thumbnails 2404 can be used to perform rudimentary page analysis. For example, using the thumbnails 2404, the Web content might check for images on each of the pages. Since images can require substantially more consumables to print, the estimate of the ability to complete the print job can reflect this and, thus provide a more accurate estimate. Web-based imaging makes this possible because Web-based imaging brings together the document and Web content representing a device or service. The Web content can use the Web-based imaging "extension" to selectively access information about the document. Normally, the document would have to be uploaded to the remote Web service (rather than the local Web content running in the browser) to do this sort of analysis.

Once given the above disclosure, many other features, modifications or improvements will become apparent to the skilled artisan. Such features, modifications or improvements are, therefore, considered to be a part of this invention, the scope of which is to be determined by the following claims.

What is claimed is:

1. A method for print job assurance, comprising the steps of:
   selecting a document to be printed;
   selecting a target printer;
   viewing a characteristic of said document on a target printer home page;
   determining if said target printer can print said document;
   providing a display from said target printer as to whether or not said target printer can complete said printing of said document; and
   printing said document on a media.

2. The method, as in claim 1, wherein said document selecting step is further comprised of the step of:
   composing said document to be printed.

3. The method, as claim 1, wherein said document selecting step is further comprised of the step of:
   obtaining a target image from a first web site.

4. The method, as in claim 1, wherein said viewing step is further comprised of the step of:
   viewing a print preview image.

5. The method, as in claim 1, wherein said determining step is further comprised of the steps of:
   viewing said document to be printed and determining a desired number of copies of said document to be printed; and
   interacting with said target printer.

6. The method, as in claim 5, wherein said interacting step is further comprised of the step of:
   determining if said target printer contains a desired amount of media.

7. The method, as in claim 5, wherein said interacting step is further comprised of the step of:
   determining if said target printer contains a desired amount of toner to print said desired number of copies of said document.

8. The method, as in claim 5, wherein said interacting step is further comprised of the step of:
   determining if said target printer can print said desired number of copies of said document.

9. The method, as in claim 5, wherein said interacting step is further comprised of the step of:
   determining if said target printer can duplex said document, if necessary.

10. The method, as in claim 5, wherein said interacting step is further comprised of the steps of:
    employing a browser located substantially within a computer;
    establishing a connection between said browser and a server located substantially on a printer; and
    interacting between said browser and said server.

11. The method, as in claim 5, wherein said interacting step is further comprised of the steps of:
    employing a browser located substantially within a computer;
    establishing a connection between said browser and a server located substantially on a first web site; and
    interacting between said browser and said server.

12. The method, as in claim 5, wherein said interacting step is further comprised of the steps of:
    employing a browser located substantially within a computer;
    establishing a connection between said browser and a server located substantially on a second computer; and
    interacting between said browser and said server.

13. The method, as in claim 1, wherein said method is further comprised of the step of:
    showing a preview of said document on said target printer home page.

14. The method, as in claim 1, wherein said method is further comprised of the step of:
    providing an alarm from said target printer as to whether or not said target printer-can complete said printing of said document.

15. The method, as in claim 13, wherein said method is further comprised of the step of:
    providing a display from said target printer home page as to whether or not said target printer can complete said printing of said document.

16. The method, as in claim 13, wherein said method is further comprised of the step of:
    providing an alarm from said target printer home page as to whether or not said target printer can complete said printing of said document.

17. The method, as in claim 1, wherein said determining step is further comprised of the step of:
    providing an indication from said target printer as to an amount of time required for said target printer to complete said printing of said document.

18. The method, as in claim 17 wherein said indication is further comprised of:
    a display means.

19. A program storage medium readable by a computer, tangibly embodying a program of instruction executable by the computer to perform method steps for using a resource of an external device, the method steps comprising:
    selecting a document to be printed;
    selecting a target printer;
    viewing a characteristic of said document on a target printer home page;
    determining if said target printer can print said document;
    providing a display from said target printer as to whether or not said target printer can complete said printing of said document; and
    printing said document on a media.

* * * * *